US011501551B2

(12) United States Patent
Mukherji

(10) Patent No.: US 11,501,551 B2
(45) Date of Patent: Nov. 15, 2022

(54) DOCUMENT PROCESSING OPTIMIZATION

(71) Applicant: Optum Services (Ireland) Limited, Dublin (IE)

(72) Inventor: Raja Mukherji, Dublin (IE)

(73) Assignee: Optum Services (Ireland) Limited, Dublin (IE)

( * ) Notice: Subject to any disclaimer, the term of this patent is extended or adjusted under 35 U.S.C. 154(b) by 125 days.

(21) Appl. No.: 16/895,422

(22) Filed: Jun. 8, 2020

(65) Prior Publication Data
US 2021/0383109 A1 Dec. 9, 2021

(51) Int. Cl.
*G06K 9/62* (2022.01)
*G06V 30/418* (2022.01)
*G06V 30/414* (2022.01)

(52) U.S. Cl.
CPC ......... *G06V 30/418* (2022.01); *G06K 9/6218* (2013.01); *G06K 9/6262* (2013.01); *G06V 30/414* (2022.01)

(58) Field of Classification Search
None
See application file for complete search history.

(56) References Cited

U.S. PATENT DOCUMENTS

| | | | |
|---|---|---|---|
| 5,131,053 A * | 7/1992 | Bernzott | G06V 10/24 382/229 |
| 6,442,555 B1 * | 8/2002 | Shmueli | G06F 16/355 |
| 6,542,635 B1 | 4/2003 | Hu et al. | |
| 6,895,552 B1 | 5/2005 | Balabanovic et al. | |
| 7,428,541 B2 | 9/2008 | Houle | |
| 7,734,627 B1 | 6/2010 | Tong | |
| 8,719,291 B2 | 5/2014 | Gatterbauer et al. | |
| 8,782,515 B2 * | 7/2014 | Le Chevalier | G06F 40/154 715/236 |
| 8,843,494 B1 | 9/2014 | Sampson | |

(Continued)

FOREIGN PATENT DOCUMENTS

JP 2010061587 A * 3/2010

OTHER PUBLICATIONS

Wong, R.G. Casey, F.M. Wahl: Document analysis system. IBM J. Res. Dev., 26: 647-656, 1982 (Year: 1982).*

(Continued)

*Primary Examiner* — Feng Niu
(74) *Attorney, Agent, or Firm* — Alston & Bird LLP

(57) ABSTRACT

There is a need for more effective and efficient document processing solution. Accordingly, various embodiments of the present invention introduce various document processing optimization solutions. In one example, a method includes identifying a plurality of input pages each associated with a related input document of a plurality of input documents; for each input page of the plurality of input pages, generating a segmented page; processing each segmented page using a trained encoder model to generate a fixed-dimensional representation of the input page; determining, based at least in part on each fixed-dimensional representation, a plurality of document clusters; determining a plurality of processing groups, where each processing group is associated with one or more related document clusters of the plurality of document clusters; and performing the document processing optimization based at least in part on the plurality of processing groups.

19 Claims, 15 Drawing Sheets

(56) References Cited

U.S. PATENT DOCUMENTS

| | | | |
|---|---|---|---|
| 9,727,911 B2* | 8/2017 | Sharma | G06Q 40/02 |
| 9,754,163 B2* | 9/2017 | Segalovitz | G06V 30/194 |
| 10,095,677 B1* | 10/2018 | Manohar | G06V 10/50 |
| 10,599,924 B2* | 3/2020 | Yang | G06V 30/413 |
| 10,789,281 B2* | 9/2020 | Proux | G06F 16/00 |
| 11,200,259 B2* | 12/2021 | Coquard | G06F 40/263 |
| 2004/0223197 A1 | 11/2004 | Ohta et al. | |
| 2011/0137898 A1* | 6/2011 | Gordo | G06F 16/93 |
| | | | 707/E17.089 |
| 2013/0174010 A1* | 7/2013 | Le Chevalier | G06F 40/154 |
| | | | 715/234 |
| 2016/0098645 A1* | 4/2016 | Sharma | G06F 16/313 |
| | | | 706/12 |
| 2017/0083762 A1* | 3/2017 | Segalovitz | G06T 5/009 |
| 2018/0300576 A1* | 10/2018 | Dalyac | G06V 10/255 |
| 2019/0005050 A1 | 1/2019 | Proux et al. | |
| 2019/0026550 A1* | 1/2019 | Yang | G06V 30/414 |
| 2020/0167558 A1* | 5/2020 | Yang | G06V 30/413 |
| 2020/0184316 A1* | 6/2020 | Kavukcuoglu | G06N 3/0454 |
| 2020/0327151 A1* | 10/2020 | Coquard | G06F 16/3347 |
| 2021/0110298 A1* | 4/2021 | Bisson-Krol | G06F 3/04845 |
| 2021/0357680 A1* | 11/2021 | Chen | G06N 3/08 |

OTHER PUBLICATIONS

Shin et al., "Classification of document pages using structure-based features." International Journal on Document Analysis and Recognition 3, No. 4 (2001): 232-247. (Year: 2001).*

Cesarini et al., "Encoding of modified X-Y trees for document classification," Proceedings of Sixth International Conference on Document Analysis and Recognition, 2001, pp. 1131-1136, doi: 10.1109/ICDAR.2001.953962. (Year: 2001).*

Héroux et al., "Classification method study for automatic form class identification." In Proceedings. Fourteenth International Conference on Pattern Recognition (Cat. No. 98EX170), vol. 1, pp. 926-928. IEEE, 1998. (Year: 1998).*

Usilin et al., "Visual appearance based document image classification", Image Processing (ICIP) 2010 17th IEEE International Conference on, pp. 2133-2136, 2010. (Year: 2010).*

Baldi et al., "Using tree-grammars for training set expansion in page classification", Document Analysis and Recognition 2003. Proceedings. Seventh International Conference on, pp. 829-833, 2003. (Year: 2003).*

Mao et al., "Unsupervised style classification of document page images", Image Processing 2005. ICIP 2005. IEEE International Conference on, vol. 2, pp. II-510, 2005. (Year: 2005).*

International Searching Authority, International Search Report and Written Opinion for International Application No. PCT/US2021/030782, dated Jul. 30, 2021, (15 pages), European Patent Office, Rijswijk, Netherlands.

Ahmadullin, Ildus et al. "Document Visual Similarity Measure For Document Search," In Proceedings of the 11th ACM Symposium on Document Engineering, Sep. 19, 2011, pp. 139-142.

Bohunsky, Paul et al. "Visual Structure-Based Web Page Clustering and Retrieval," In Proceedings of the 19th International Conference on World Wide Web, Apr. 26, 2010, pp. 1067-1068.

Chen, Nawei et al. "A Survey Of Document Image Classification: Problem Statement, Classifier Architecture and Performance Evaluation," International Journal of Document Analysis and Recognition (IJDAR), vol. 10, No. 1, pp. 1-6, Jun. 1, 2007. DOI:10.1007/s10032-006-0020-2.

Chu, Wenqing et al. "Stacked Similarity-Aware Autoencoders,"In Proceedings of the Twenty-Sixth International Joint Conference On Artificial Intelligence (IJCAI-17), Jun. 2017, pp. 1561-1567.

Collins-Thompson, Kevyn et al. "A Clustering-Based Algorithm For Automatic Document Separation," In SIGIR 2002 Workshop on Information Retrieval and OCR: From Converting Content to Grasping, Meaning, (5 pages), (2002), Tampere, Finland.

Eglin, Veronique et al. "Document Page Similarity Based On Layout Visual Saliency: Application To Query By Example and Document Classification," In Seventh International Conference on Document Analysis and Recognition, pp. 1208-1212, Aug. 6, 2003. IEEE.

Hemalatha, M. et al. "Hybrid Neural Network Model For Web Document Clustering," In 2009 Second International Conference on the Applications of Digital Information and Web Technologies, Aug. 4, 2009, pp. 531-538, IEEE.

Larsen, Anders Boesen Lindbo et al. "Autoencoding Beyond Pixels Using A Learned Similarity Metric," In International Conference On Machine Learning, Jun. 11, 2016, pp. 1558-1566. PMLR.

Spasojevic, Nemanja et al. "Large Scale Page-Based Book Similarity Clustering," In 2011 International Conference on Document Analysis and Recognition, Sep. 18, 2011, pp. 119-125, IEEE.

Takama, Yasufumi et al. "Document Similarity Judgment for Interactive Document Clustering," SCIS & ISIS SCIS & ISIS 2010, Japan Society for Fuzzy Theory and Intelligent Informatics, pp. 1310-1315, Dec. 8-12, 2010.

Tjhi, William-Chandra et al. "Possibilistic Fuzzy Co-Clustering Of Large Document Collections," Pattern Recognition, vol. 40, No. 12, Dec. 1, 2007, pp. 3452-3466.

\* cited by examiner

DOCUMENT PROCESSING OPTIMIZATION

BACKGROUND

Various embodiments of the present invention address technical challenges related to document processing. Various embodiments of the present invention disclose innovative techniques for performing document processing by utilizing document processing optimization.

BRIEF SUMMARY

In general, embodiments of the present invention provide methods, apparatus, systems, computing devices, computing entities, and/or the like for document processing optimization. Certain embodiments utilize systems, methods, and computer program products that perform document optimization by utilizing at least one of page segmentation, document clusters, page clusters, fixed-dimensional representation of pages, and document processing groups.

In accordance with one aspect, a method is provided. In one embodiment, the method comprises identifying a plurality of input pages each associated with a related input document of a plurality of input documents; for each input page of the plurality of input pages, generating a segmented page, wherein generating the segmented page for a particular input page of the plurality of input pages comprises: (i) identifying one or more page segments in the particular input page, wherein each page segment of the one or more page segments is associated with a relative location within the particular input page; (ii) for each page segment of the one or more page segments, determining a content pixel density ratio; and (iii) generating the segmented page as a data object that describes, for each page segment of the one or more page segments, the relative location for the page segment and the content pixel density ratio for the page segment; processing each segmented page for an input page of the plurality of input pages using a trained encoder model in order to generate a fixed-dimensional representation of the input page; determining, based at least in part on each fixed-dimensional representation for an input page of the plurality of input pages, a plurality of document clusters, wherein each document cluster of the plurality of document clusters comprises a related subset of the plurality of documents; determining a plurality of processing groups, wherein: (i) each processing group of the plurality of processing groups is associated with one or more related document clusters of the plurality of document clusters, (ii) each processing group of the plurality of processing groups comprises a subset of the plurality of input documents that is associated with at least one of the one or more related document clusters for the processing group, and (iii) each processing group of the plurality of processing groups is associated with an assigned processing agent of a plurality of processing agents; and performing the document processing optimization based at least in part on the plurality of processing groups.

In accordance with another aspect, a computer program product is provided. The computer program product may comprise at least one computer-readable storage medium having computer-readable program code portions stored therein, the computer-readable program code portions comprising executable portions configured to identify a plurality of input pages each associated with a related input document of a plurality of input documents; for each input page of the plurality of input pages, generate a segmented page, wherein generating the segmented page for a particular input page of the plurality of input pages comprises: (i) identifying one or more page segments in the particular input page, wherein each page segment of the one or more page segments is associated with a relative location within the particular input page; (ii) for each page segment of the one or more page segments, determining a content pixel density ratio; and (iii) generating the segmented page as a data object that describes, for each page segment of the one or more page segments, the relative location for the page segment and the content pixel density ratio for the page segment; process each segmented page for an input page of the plurality of input pages using a trained encoder model in order to generate a fixed-dimensional representation of the input page; determine, based at least in part on each fixed-dimensional representation for an input page of the plurality of input pages, a plurality of document clusters, wherein each document cluster of the plurality of document clusters comprises a related subset of the plurality of documents; determining a plurality of processing groups, wherein: (i) each processing group of the plurality of processing groups is associated with one or more related document clusters of the plurality of document clusters, (ii) each processing group of the plurality of processing groups comprises a subset of the plurality of input documents that is associated with at least one of the one or more related document clusters for the processing group, and (iii) each processing group of the plurality of processing groups is associated with an assigned processing agent of a plurality of processing agents; and perform the document processing optimization based at least in part on the plurality of processing groups.

In accordance with yet another aspect, an apparatus comprising at least one processor and at least one memory including computer program code is provided. In one embodiment, the at least one memory and the computer program code may be configured to, with the processor, cause the apparatus to identify a plurality of input pages each associated with a related input document of a plurality of input documents; for each input page of the plurality of input pages, generate a segmented page, wherein generating the segmented page for a particular input page of the plurality of input pages comprises: (i) identifying one or more page segments in the particular input page, wherein each page segment of the one or more page segments is associated with a relative location within the particular input page; (ii) for each page segment of the one or more page segments, determining a content pixel density ratio; and (iii) generating the segmented page as a data object that describes, for each page segment of the one or more page segments, the relative location for the page segment and the content pixel density ratio for the page segment; process each segmented page for an input page of the plurality of input pages using a trained encoder model in order to generate a fixed-dimensional representation of the input page; determine, based at least in part on each fixed-dimensional representation for an input page of the plurality of input pages, a plurality of document clusters, wherein each document cluster of the plurality of document clusters comprises a related subset of the plurality of documents; determining a plurality of processing groups, wherein: (i) each processing group of the plurality of processing groups is associated with one or more related document clusters of the plurality of document clusters, (ii) each processing group of the plurality of processing groups comprises a subset of the plurality of input documents that is associated with at least one of the one or more related document clusters for the processing group, and (iii) each processing group of the plurality of processing groups is associated with an assigned processing agent of a plurality of processing agents; and perform the document processing optimization based at least in part on the plurality of processing groups.

BRIEF DESCRIPTION OF THE DRAWINGS

Figure 1:
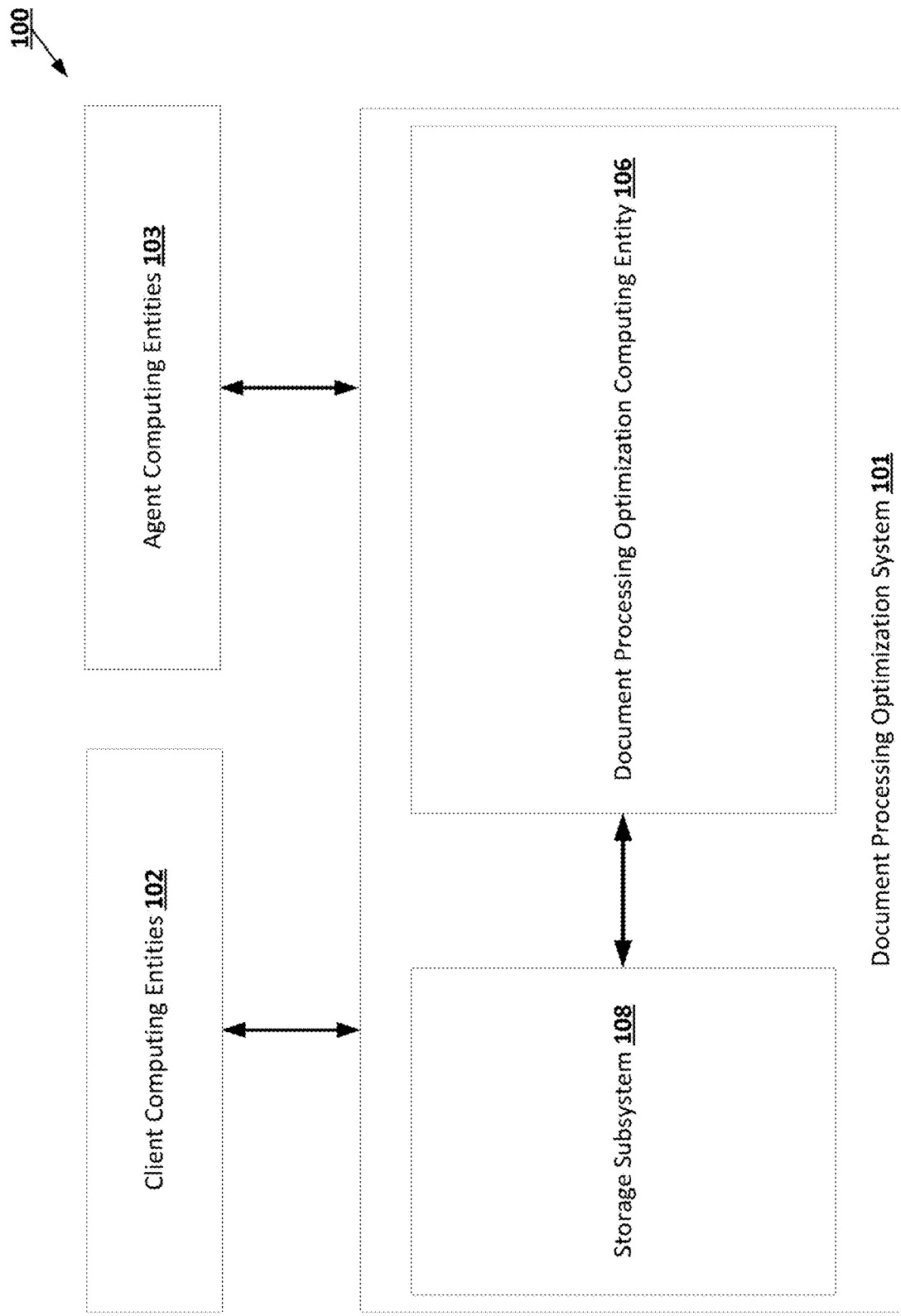

Having thus described the invention in general terms, reference will now be made to the accompanying drawings, which are not necessarily drawn to scale, and wherein:

FIG. 1 provides an exemplary overview of a hardware architecture that can be used to practice embodiments of the present invention.

Figure 2:
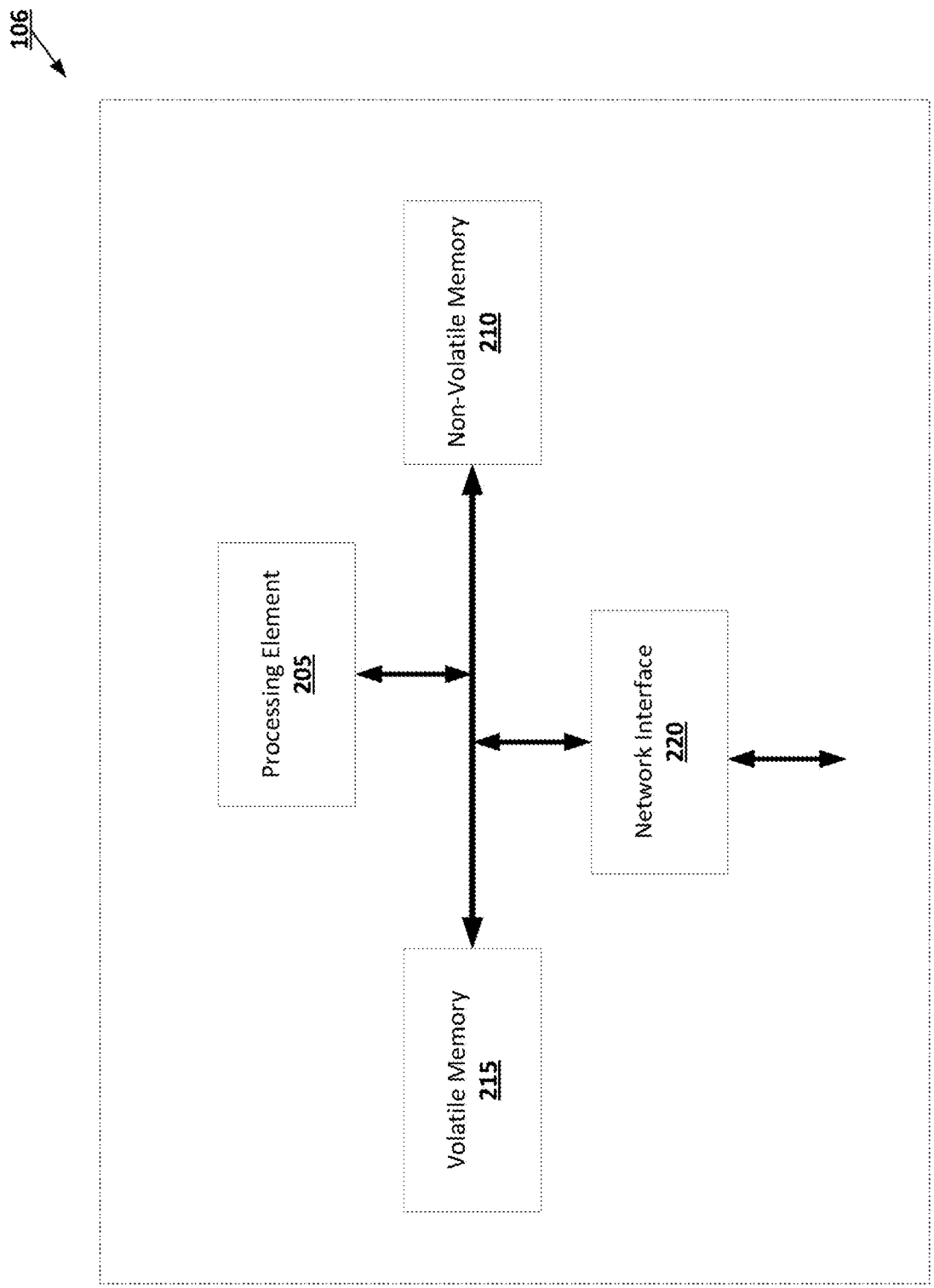

FIG. 2 provides an example document processing optimization computing entity, in accordance with some embodiments discussed herein.

Figure 3:
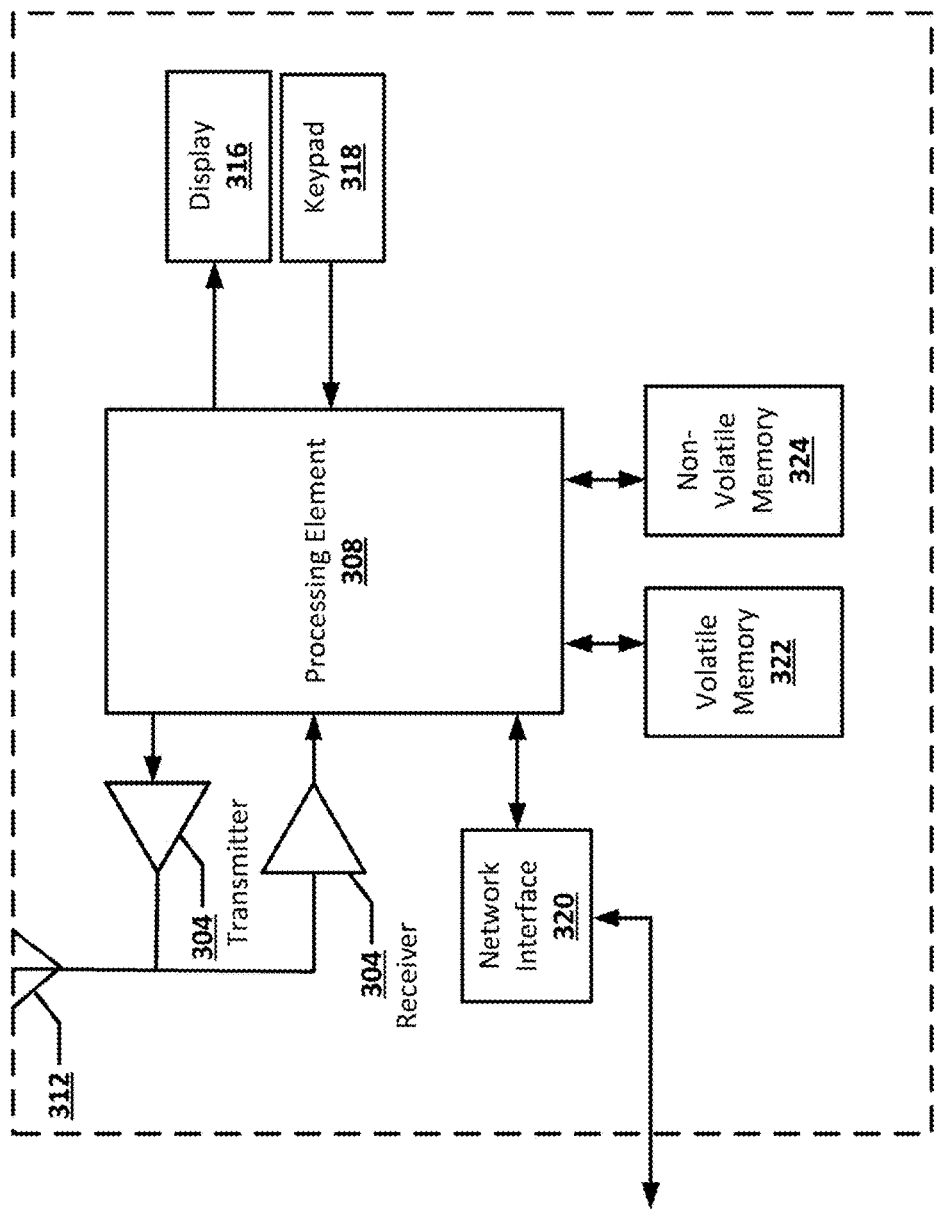

FIG. 3 provides an example client computing entity, in accordance with some embodiments discussed herein.

Figure 4:
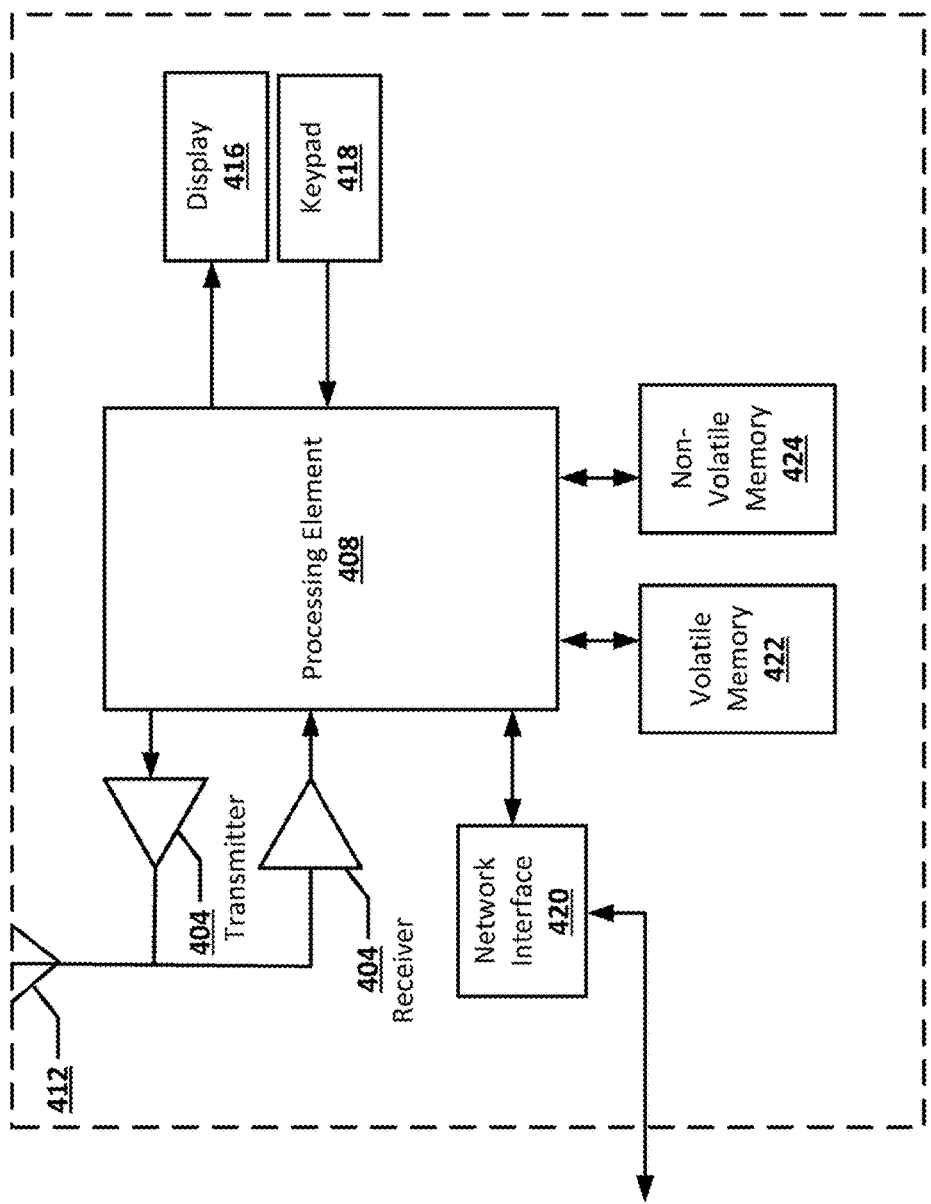

FIG. 4 provides an example agent computing entity, in accordance with some embodiments discussed herein.

Figure 5:
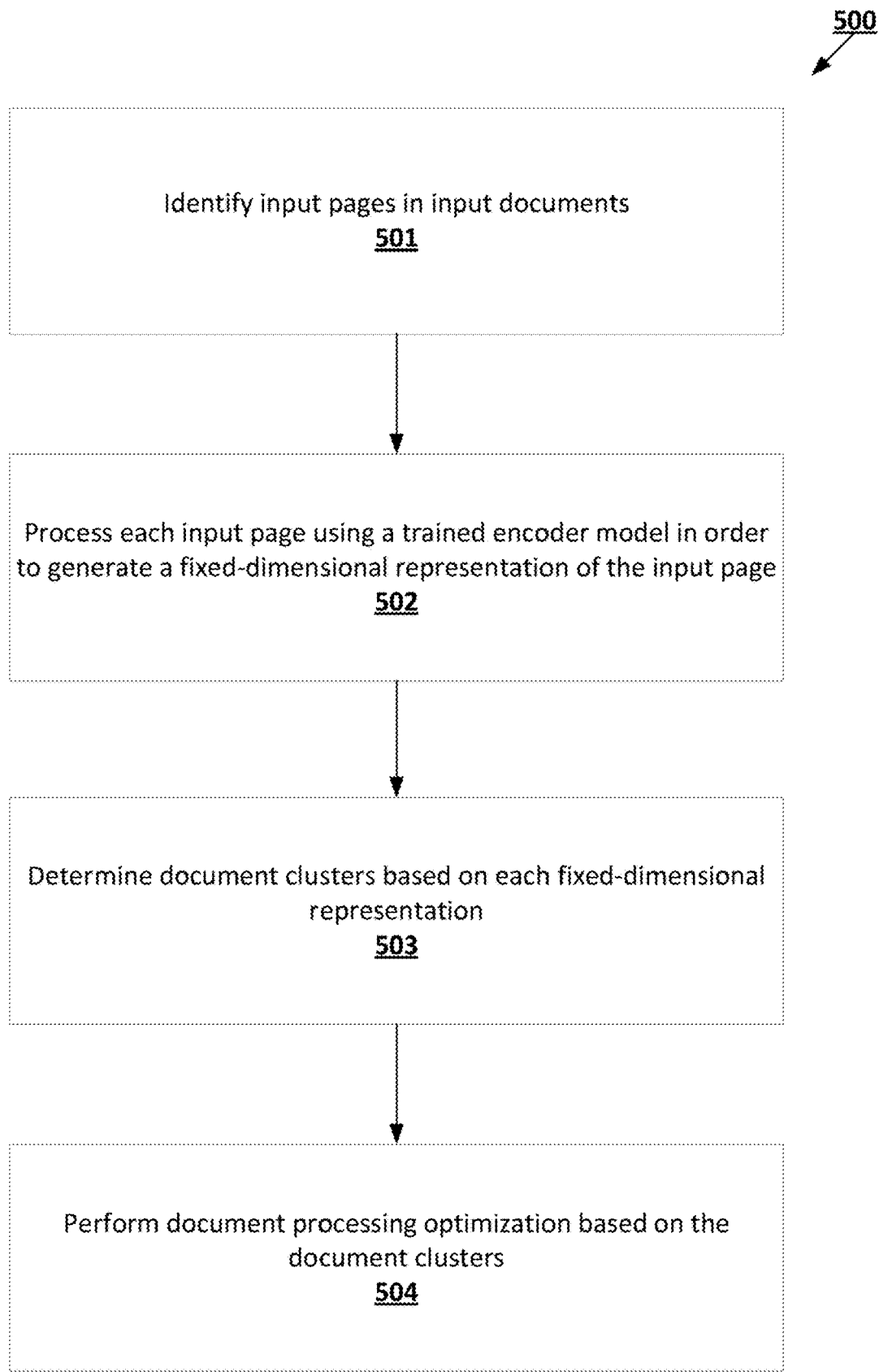

FIG. 5 is a flowchart diagram of an example process for document processing optimization, in accordance with some embodiments discussed herein.

Figure 6:
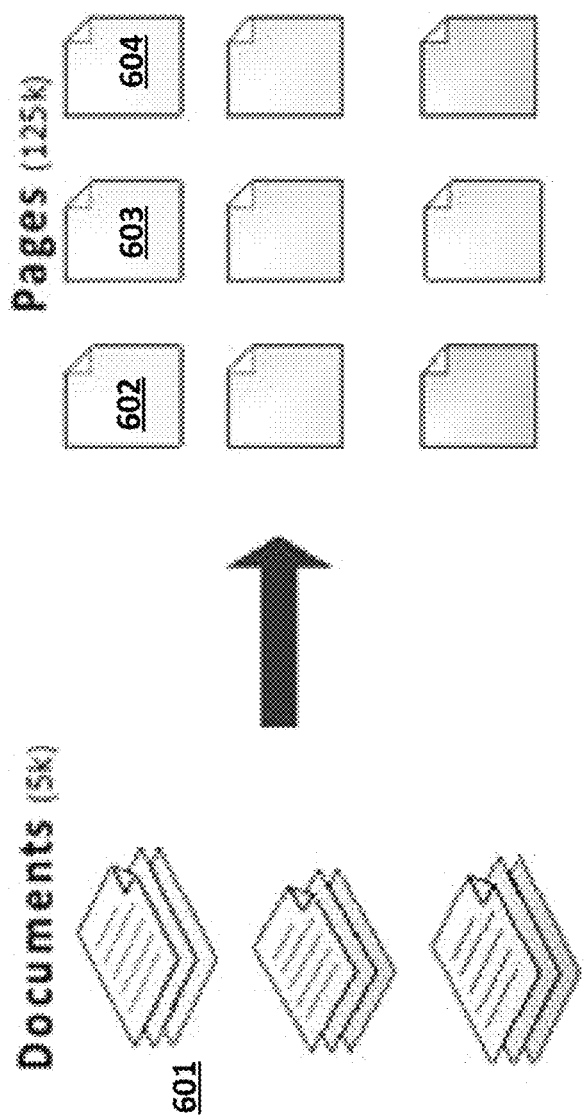

FIG. 6 provides an operational example of division of input documents into input pages, in accordance with some embodiments discussed herein.

Figure 7:
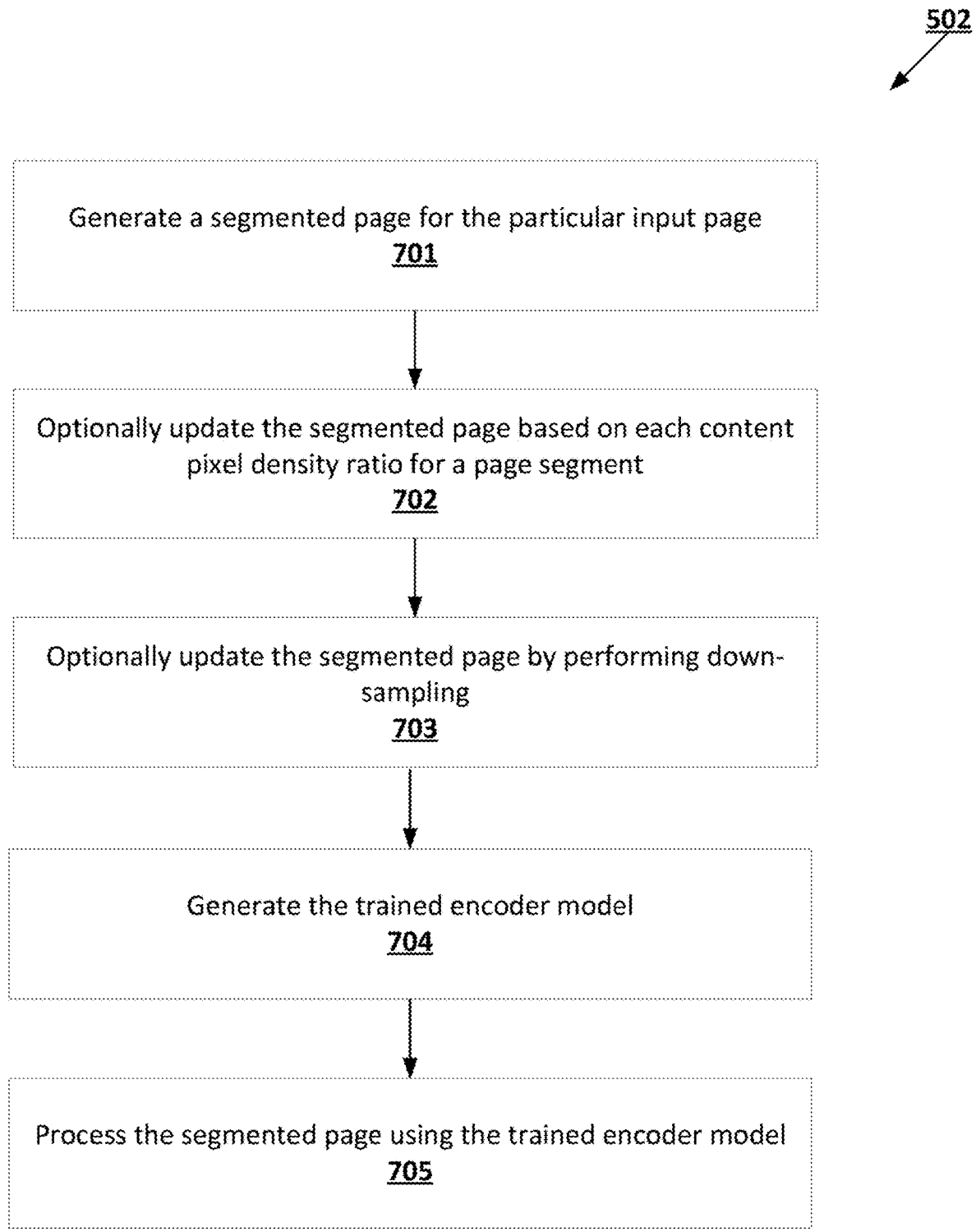

FIG. 7 is a flowchart of generating a fixed-dimensional representation of an input page, in accordance with some embodiments discussed herein.

Figure 8:
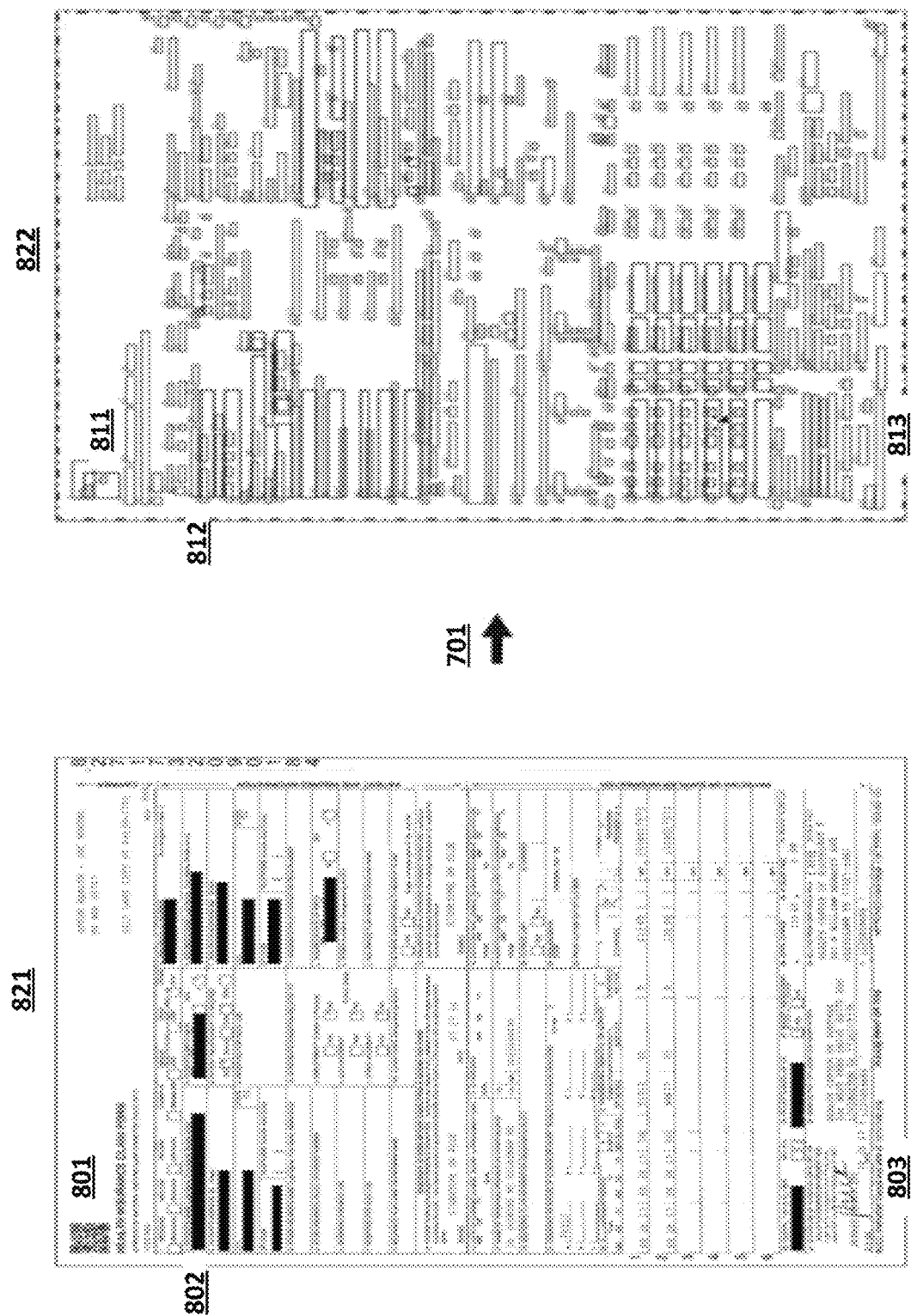

FIG. 8 provides an operational example of generating a segmented page for an input page, in accordance with some embodiments discussed herein.

Figure 9:
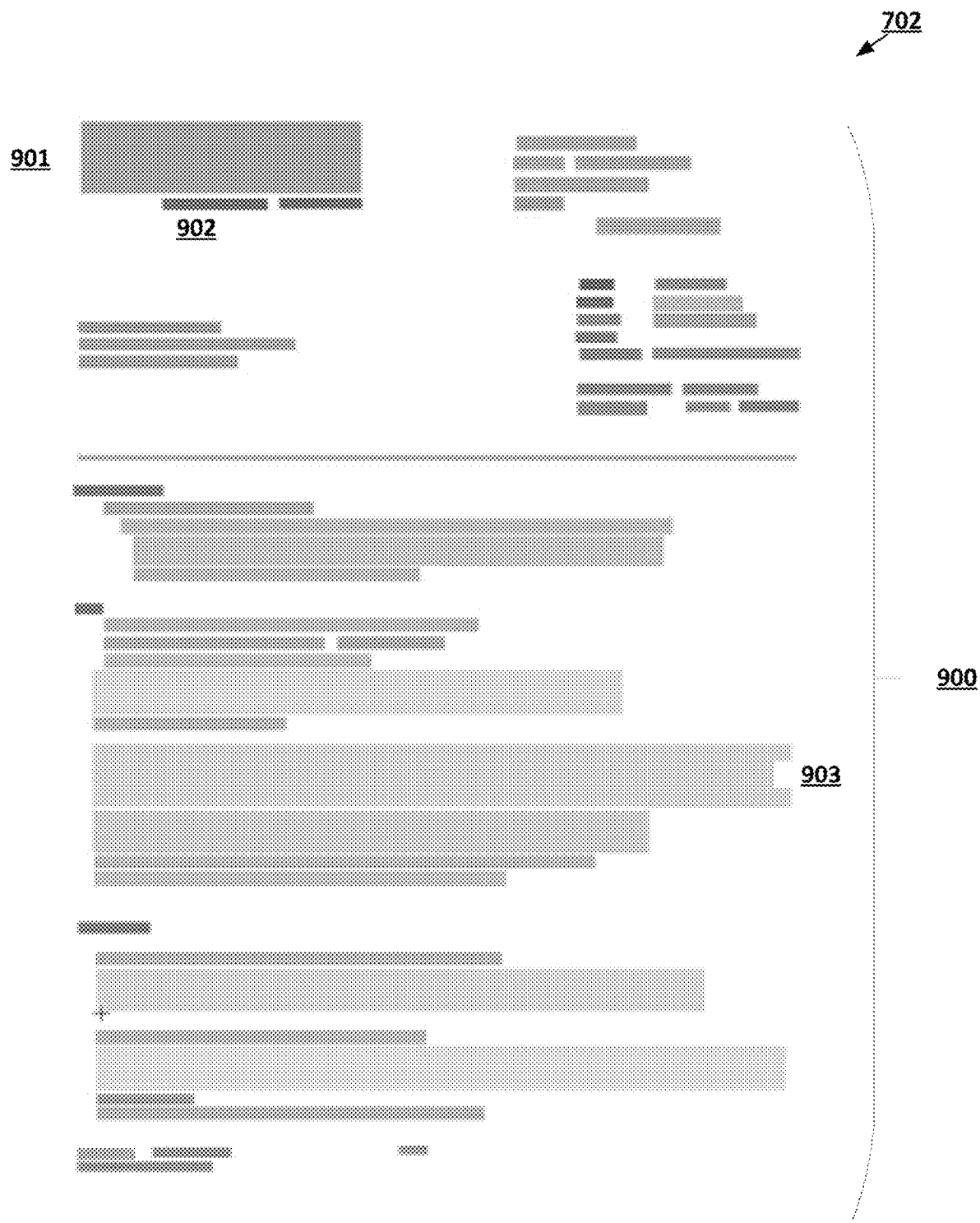

FIG. 9 provides an operational example of replacing page segments of a segmented page with segment colors, in accordance with some embodiments discussed herein.

Figure 10:
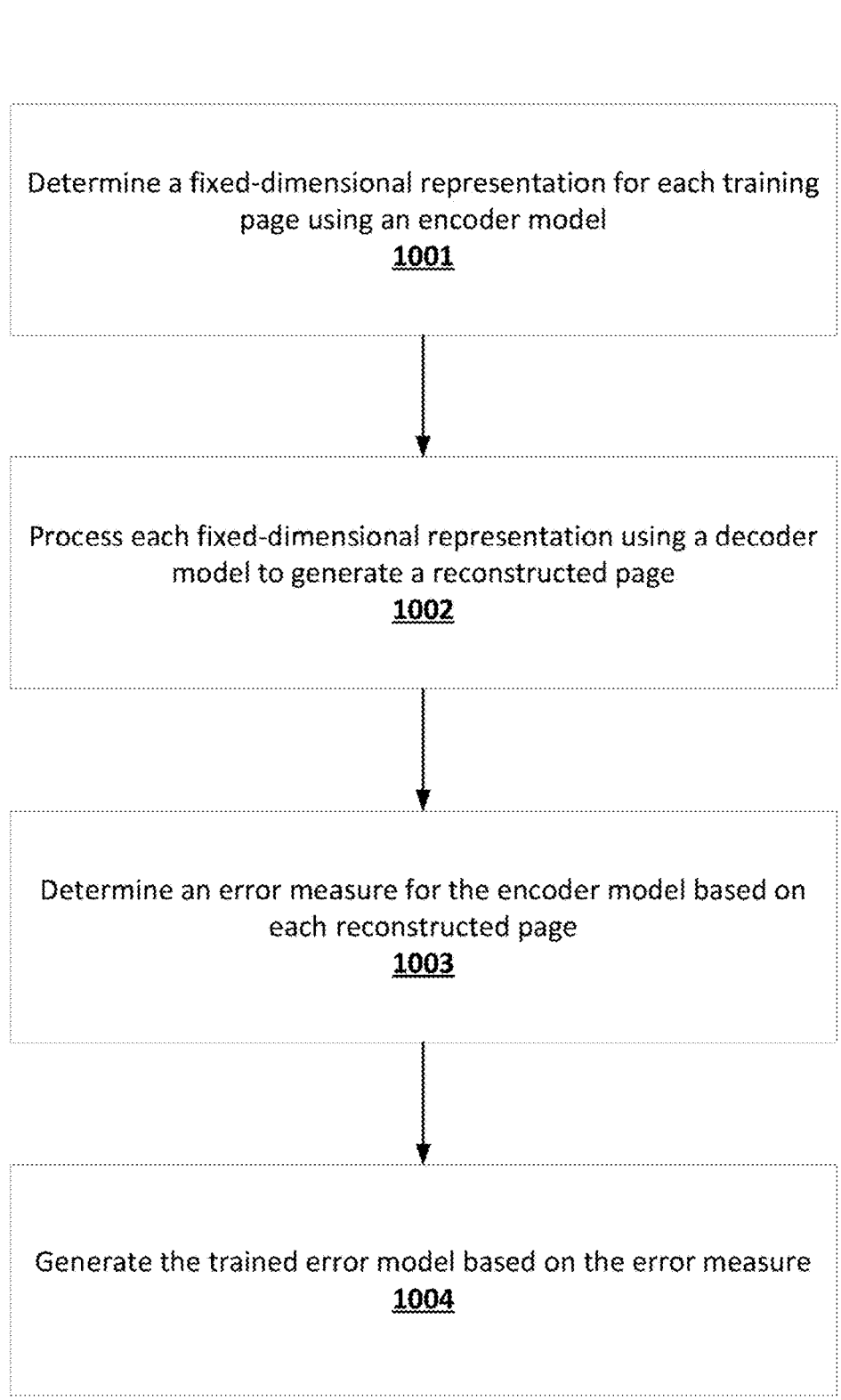

FIG. 10 is a flowchart diagram of an example process for generating a trained encoder model configured to generate fixed-dimensional representations of input pages, in accordance with some embodiments discussed herein.

Figure 11:
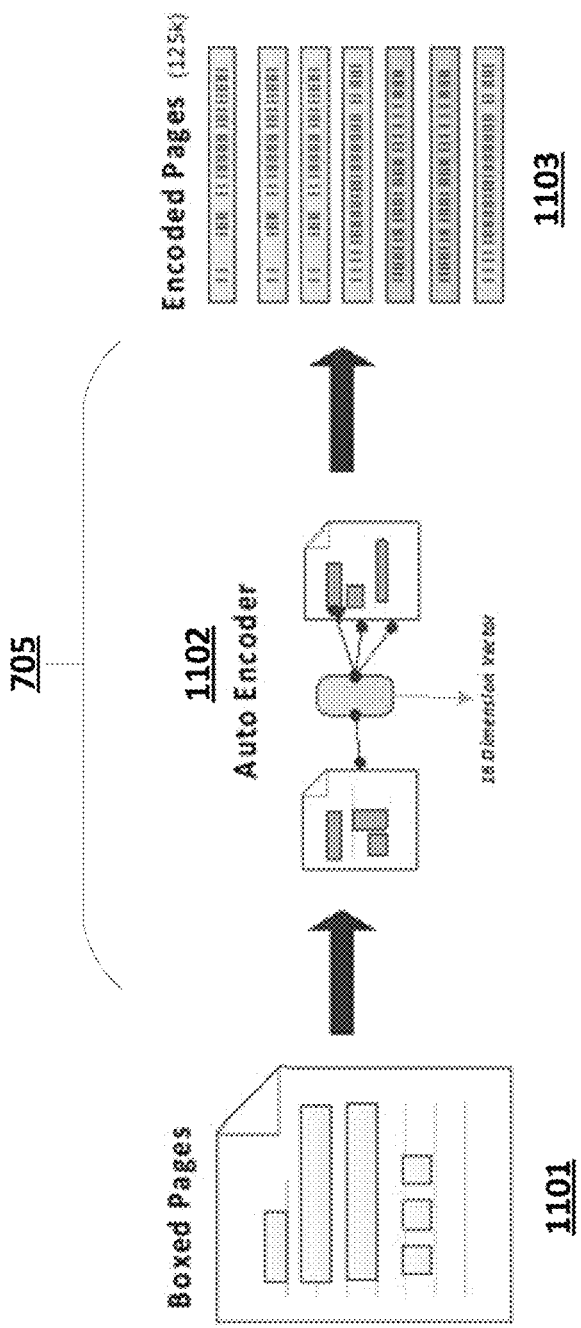

FIG. 11 provides an operational example of fixed-dimensional representations of segmented pages, in accordance with some embodiments discussed herein.

Figure 12:
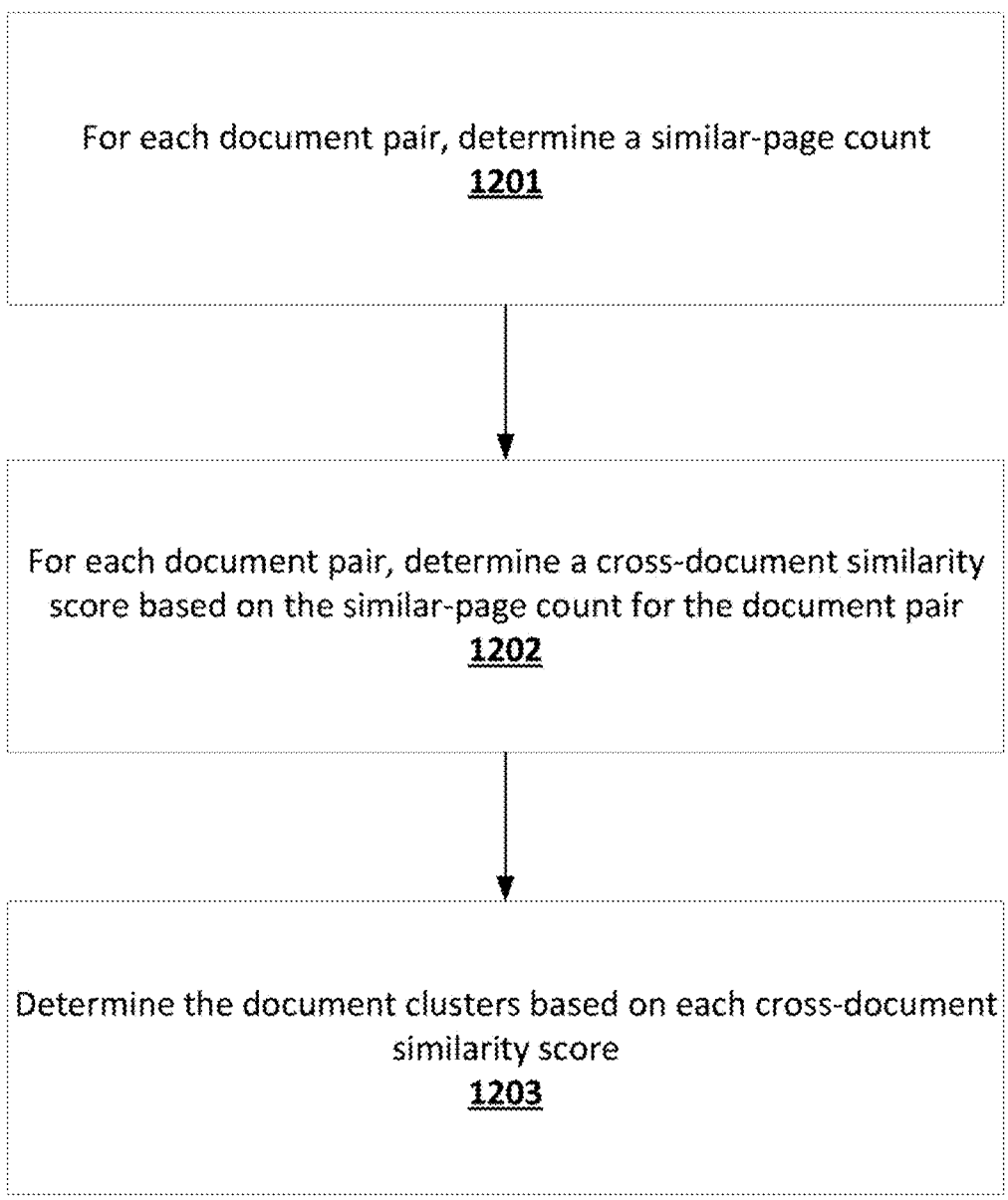

FIG. 12 is a flowchart diagram of an example process for determining a plurality of document clusters based at least in part on cross-document page comparisons, in accordance with some embodiments discussed herein.

Figure 13:
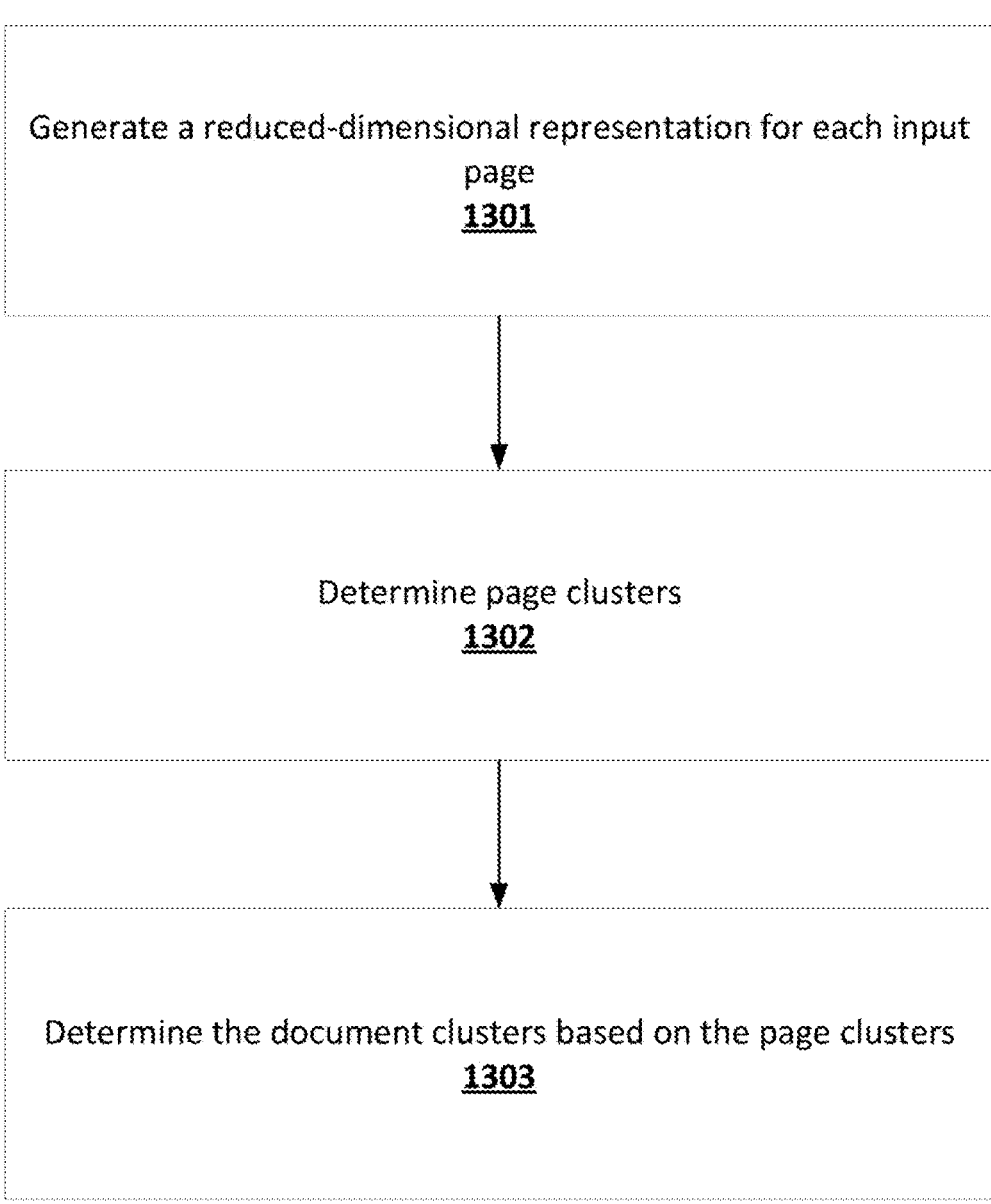

FIG. 13 is a flowchart diagram of an example process for determining a plurality of document clusters based at least in part on page clusters, in accordance with some embodiments discussed herein.

Figure 14:
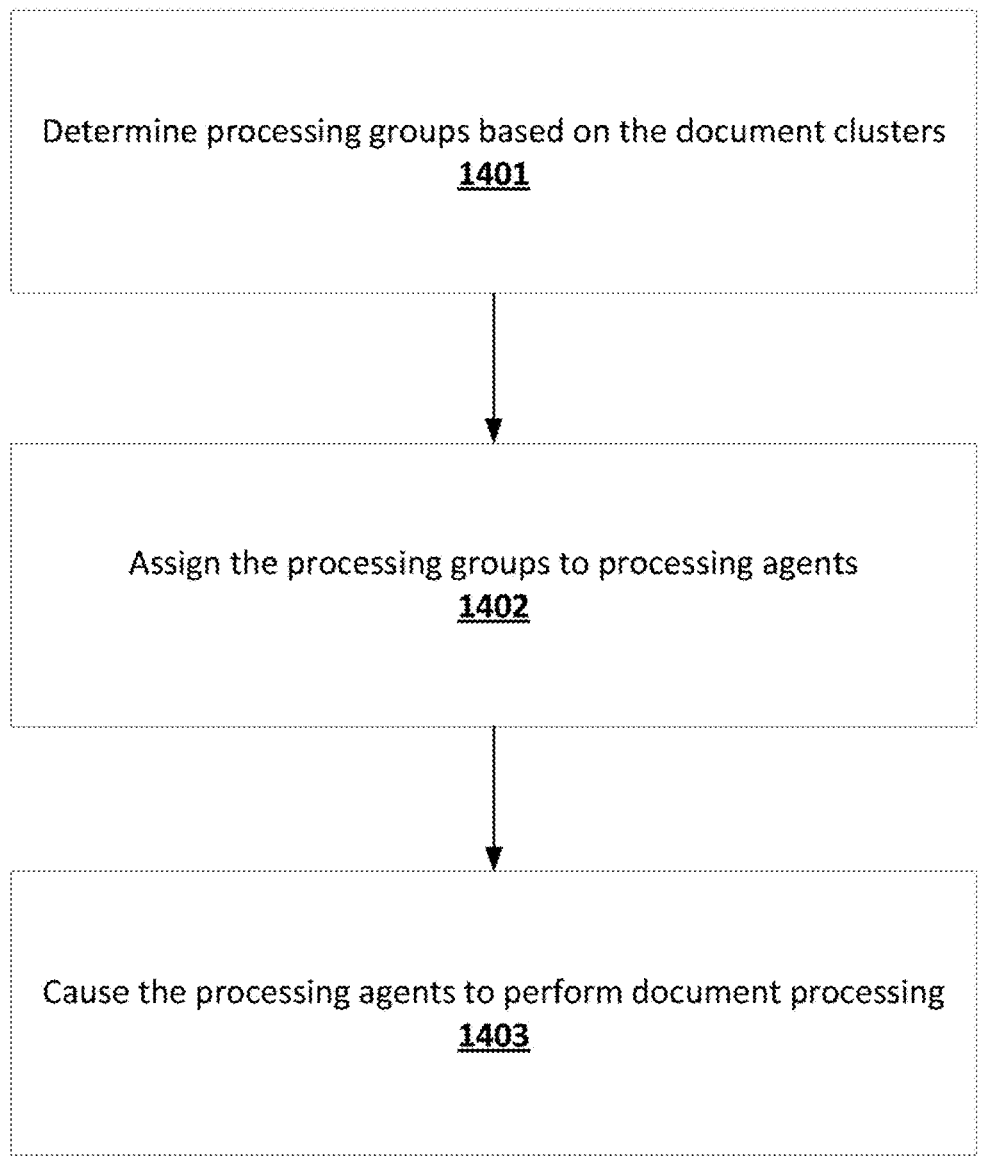

FIG. 14 is a flowchart diagram of an example process for performing document processing using document clusters in accordance with some embodiments discussed herein.

Figure 15:
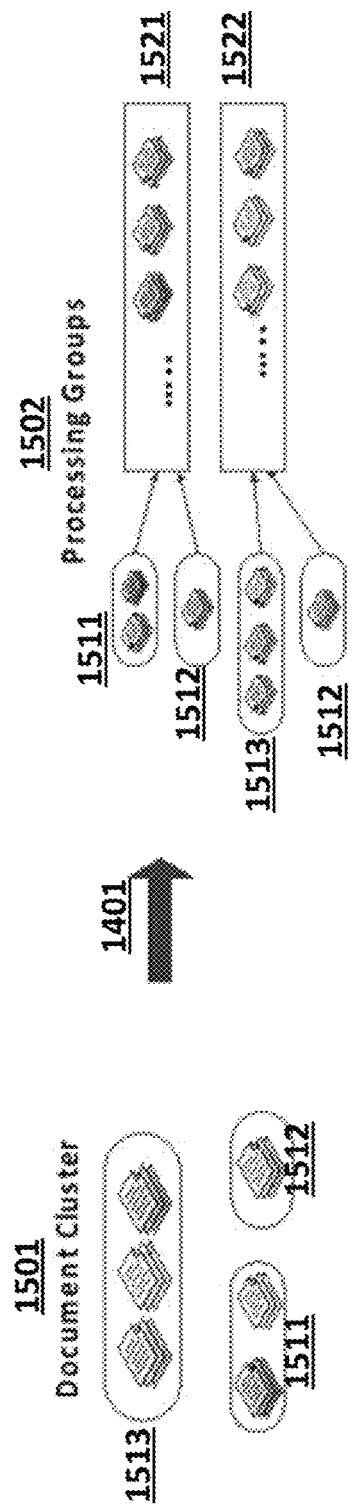

FIG. 15 is an operational diagram of an example process for determining processing groups, in accordance with some embodiments discussed herein.

DETAILED DESCRIPTION

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout. Moreover, one of ordinary skill in the art will recognize that the disclosed concepts can be used to perform other types of data analysis.

I. OVERVIEW

Various embodiments of the present invention provide techniques for increasing efficiency and reliability of document processing systems by dynamically separating a batch of documents into processing groups based at least in part on structural similarity of the pages of the noted documents. Absent this dynamic separation process, processing of documents by processing agents (e.g., automated processing agents) may be less efficient and less accurate, as the processing agents will be less likely to capture cross-temporal expertise acquired from repeatedly processing input documents having similar structural formats. This in turn reduces the overall operational bandwidth and overall operational reliability of a multi-agent distributed document processing system. Accordingly, by dynamically separating a batch of documents into processing groups based at least in part on structural similarity of the pages of the noted documents, various embodiments of the present invention make important technical contributions to efficiency and reliability of document processing systems, and substantially improve overall operational bandwidth and overall operational reliability of existing multi-agent distributed document processing systems.

Moreover, various embodiments of the present invention make important technical contributions to the field of document clustering by introducing techniques for integrating page-level similarity data in inferring document clusters. For example, various embodiments of the present invention introduce techniques for determining whether two documents should be included in the same document cluster based at least in part on a count of sufficiently similar pages between the two documents. As another example, various embodiments of the present invention introduce techniques for determining whether two documents should be included in the same document cluster based at least in part on a ratio of pages of the two documents that are deemed to be within a common page cluster. As page-level similarity analyses are often computationally less resource-intensive than document-level similarity analyses, the noted techniques for integrating page-level similarity data in inferring document clusters can reduce the computational cost of document clustering. Accordingly, by introducing techniques for integrating page-level similarity data in inferring document clusters can reduce the computational cost of document clustering, various embodiments of the present invention make important technical contributions to improving computational efficiency of document clustering systems.

II. DEFINITIONS

An "input document" may be a data object that describes a collection of content data, such as a collection of text data and/or a collection of image data. Examples of the input documents include Portable Document Format (PDF) documents, Tagged Image File Format (TIFF) documents, Microsoft Word documents, and/or the like. Each input document includes one or more input pages.

An "input page" may be a data object that describes a visually contiguous portion of an input document. In some embodiments, an input document is stored as a collection of input pages. Input pages of an input document may be defined based at least in part on page division data for the input document, where the page division data may define a page association for each content item associated with the input document.

An "input page" segment may be data object that describes a collection of pixels of a corresponding input page that are deemed to have contents of a common format (e.g., a common text format, a common image format, a common text format with a common font and a common size, and/or the like). In some embodiments, a computer system is configured to process an input page in order to generate a segmented page, which may be a data object that describes one or more input page segments identified by computer system to be associated with the input page.

A "training page" may be a data object that describes an input page that is configured to be used for training an encoder model, where the encoder model is configured to be utilized to generate fixed-dimensional representations of input pages. During training, a batch training pages may be processed by the encoder model to generate a fixed-dimensional representation of each training page in the batch of training pages. Afterward, the fixed-dimensional representations of the batch of training pages may be processed by a decoder model to generate a reconstructed page for each training page in the batch of training pages. The parameters of the encoder model may then be updated in accordance with a measure of deviation between reconstructed pages and the training pages across the batch of training pages.

A "fixed-dimensional representation" for a corresponding input page may be a data object that describes a vector generated by an encoder model after processing the corresponding input page based at least in part on the parameters of the encoder model. During training of the encoder model, the fixed-dimensional representation of a training page may be processed by a decoder model to generate a reconstructed page, where the deviation between the training page and the reconstructed page is utilized to update the parameters of the encoder mode. After deployment of a trained encoder model, the fixed-dimensional representation of an input page may be used to generate document clusters that are in turn used to generate processing groups for utilization by document processing agents.

A "cross-page similarity score" may be a data object that describes an estimated degree of similarity between a corresponding pair of input pages. For example, a cross-page similarity score for a first pair of pages having a more similar layout may be higher than a cross-page similarity score for a second pair of pages having a less similar layout.

A "similar-page count" may be a data object that describes a number of sufficiently-similar page pairs associated with a corresponding pair of input documents, where a sufficiently-similar page pair associated with the corresponding pair of input documents is a pair of input pages including a first page from a first input document of the pair of input documents and a second input page from a second input document of the pair of input documents with the cross-page similarity between the pair of input pages exceeding a cross-page similarity threshold. For example, given a first input document including two input pages P1 and P2 and a second input document including two input pages P3 and P4, if the cross-page similarity score for P1 and P3 is forty percent, the cross-page similarity score for P1 and P4 is sixty percent, the cross-page similarity score for P2 and P3 is seventy percent, and the cross-page similarity score for P2 and P4 is forty percent, and further if the cross-page similarity score threshold is fifty percent, the sufficiently-similarity page pairs associated with the two input documents include P1 and P4 as well as P2 and P3, and the similar-page count for the two input documents is two.

A "page cluster" may be a data object that describes a group of input pages deemed to be have a sufficiently similar input page layout. In some embodiments, to generate a group of page clusters for a group of input pages, a computer system processes each fixed-dimensional representation for an input page in the group of input pages using t-distributed stochastic neighbor embedding in order to generate a reduced-dimensional representation for each input page, and generates the group of page clusters based at least in part on each reduced-dimensional representation for an input page in the group of input pages.

A "document cluster" may be a data object that describes a group of input documents whose input pages are deemed to have sufficient input layout similarity with each other. In some embodiments, to generate a group of document clusters for a group of input documents, a computer system generates a group of page clusters for the input pages of the group of input documents, and subsequently clusters the input documents based at least in part on a degree of relatedness between each document and each page cluster. For example, if ninety percent of the input pages for a first input document fall within a first page cluster, the computer system may cluster the first input document in a document cluster that includes all input documents deemed to be sufficiently related to the first page cluster. In some embodiments, a computer system clusters two input documents as part of a common document cluster if a measure of the similar-page count for the two input documents exceeds a threshold measure.

A "processing group" may be a data object that describes a group of document clusters that are collectively assigned to a processing agent for document processing. Accordingly, a processing group includes each input document that is in at least one of the group of document clusters that is associated with the processing group. In some embodiments, to generate a group of processing groups based at least in part on a group of document clusters, a computer system randomly divides the group of document clusters into two or more document cluster subdivisions, assigns each document cluster subdivision to a processing group, and assigns each processing group to a processing agent based at least in part on an operational capacity of the processing agent. For example, if a processing group includes ten input documents, the computer system assigns the processing group to a processing agent whose operational capacity is ten or more. In some embodiments, to generate a group of processing groups based at least in part on a group of document clusters, a computer system divides the group of document clusters into two or more document cluster subdivisions based at least in part on measures of relatedness between each document cluster pairs, where each document cluster pair includes two document clusters of the group of document clusters. For example, to generate a measure of relatedness between a pair of document clusters, the computer system may randomly select a first input document from a first document cluster in the pair of document clusters and a second input document from a second document cluster in the pair of document clusters, determine a measure of cross-document similarity of the first input document and the second input document (e.g., based at least in part on a similar-page count of the first input document and the second input document), and generate the measure of relatedness based at least in part on the measure of cross-document similarity of the first input document and the second input document.

III. COMPUTER PROGRAM PRODUCTS, METHODS, AND COMPUTING ENTITIES

Embodiments of the present invention may be implemented in various ways, including as computer program products that comprise articles of manufacture. Such computer program products may comprise one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may comprise a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media comprise all computer-readable media (including volatile and non-volatile media).

In one embodiment, a non-volatile computer-readable storage medium may comprise a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also comprise a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also comprise read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also comprise conductive-bridging random access memory (CBRAM), phase-change random access memory (PRAM), ferroelectric random-access memory (FeRAM), non-volatile random-access memory (NVRAM), magneto-resistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may comprise random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

IV. EXEMPLARY SYSTEM ARCHITECTURE

FIG. 1 is a schematic diagram of an example architecture 100 for document processing optimization. The architecture 100 comprises a document processing optimization system 101, one or more client computing entities 102, and one or more agent computing entities 103. The document processing optimization system 101 is configured to generate document processing groups, provide document processing groups to the agent computing entities 103, receive document processing outputs from the agent computing entities 103, and provide the document processing outputs to the client computing entities 102.

In some embodiments, the document processing optimization system 101 may communicate with the client computing entities 102 and/or the agent computing entities 103 using one or more communication networks. Examples of communication networks comprise any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, and/or the like).

The document processing optimization system 101 may comprise a document processing optimization computing entity 106 and a storage subsystem 108. The document processing optimization computing entity 106 may be configured to generate document processing groups based at least in part on a group of input documents. The storage subsystem 108 may be configured to store input documents used by the document processing optimization computing entity 106 to perform document processing optimization. The storage subsystem 108 may further be configured to store model definition information/data for document processing optimization models used by the document processing optimization computing entity 106 to perform document processing optimization.

The storage subsystem 108 may comprise one or more storage units, such as multiple distributed storage units that are connected through a computer network. Each storage unit in the storage subsystem 108 may store at least one of one or more information/data assets and/or one or more information/data about the computed properties of one or more information/data assets. Moreover, each storage unit in the storage subsystem 108 may comprise one or more non-volatile storage or memory media including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

Exemplary Document Processing Optimization Computing Entity

FIG. 2 provides a schematic of a document processing optimization computing entity 106 according to one embodiment of the present invention. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the document processing optimization computing entity 106 may also comprise one or more network interfaces 220 for communicating with various computing entities, such as by communicating data, content, information, and/or similar terms used herein interchangeably that can be transmitted, received, operated on, processed, displayed, stored, and/or the like.

As shown in FIG. 2, in one embodiment, the document processing optimization computing entity 106 may comprise or be in communication with one or more processing elements 205 (also referred to as processors, processing circuitry, and/or similar terms used herein interchangeably) that communicate with other elements within the document processing optimization computing entity 106 via a bus, for example. As will be understood, the processing element 205 may be embodied in a number of different ways.

For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, another circuitry, and/or the like.

As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the document processing optimization computing entity 106 may further comprise or be in communication with non-volatile media (also referred to as non-volatile storage, memory, memory storage, memory circuitry and/or similar terms used herein interchangeably). In one embodiment, the non-volatile storage or memory may comprise one or more non-volatile storage or memory media 210, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or information/data that is stored in a computer-readable storage medium using one or more database models, such as a hierarchical database model, network model, relational model, entity—relationship model, object model, document model, semantic model, graph model, and/or the like.

In one embodiment, the document processing optimization computing entity 106 may further comprise or be in communication with volatile media (also referred to as volatile storage, memory, memory storage, memory circuitry and/or similar terms used herein interchangeably). In one embodiment, the volatile storage or memory may also comprise one or more volatile storage or memory media 215, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the document processing optimization computing entity 106 with the assistance of the processing element 205 and operating system.

As indicated, in one embodiment, the document processing optimization computing entity 106 may also comprise one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the document processing optimization computing entity 106 may be configured to communicate via wireless client communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the document processing optimization computing entity 106 may comprise or be in communication with one or more input elements, such as a keyboard input, a mouse input, a touch screen/display input, motion input, movement input, audio input, pointing device input, joystick input, keypad input, and/or the like. The document processing optimization computing entity 106 may also comprise or be in communication with one or more output elements (not shown), such as audio output, video output, screen/display output, motion output, movement output, and/or the like.

Exemplary Client Computing Entity

FIG. 3 provides an illustrative schematic representative of a client computing entity 102 that can be used in conjunction with embodiments of the present invention. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Client computing entities 102 can be operated by various parties. As shown in FIG. 3, the client computing entity 102 can comprise an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, correspondingly.

The signals provided to and received from the transmitter 304 and the receiver 306, correspondingly, may comprise signaling information/data in accordance with air interface standards of applicable wireless systems. In this regard, the client computing entity 102 may be capable of operating with one or more air interface standards, communication protocols, modulation types, and access types. More particularly, the client computing entity 102 may operate in accordance with any of a number of wireless communication standards and protocols, such as those described above with regard to the document processing optimization computing entity 106. In a particular embodiment, the client computing entity 102 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the client computing entity 102 may operate in accordance with multiple wired communication standards and protocols, such as those described above with regard to the document processing optimization computing entity 106 via a network interface 320.

Via these communication standards and protocols, the client computing entity 102 can communicate with various other entities using concepts such as Unstructured Supplementary Service Data (USSD), Short Message Service (SMS), Multimedia Messaging Service (MIMS), Dual-Tone Multi-Frequency Signaling (DTMF), and/or Subscriber Identity Module Dialer (SIM dialer). The client computing entity 102 can also download changes, add-ons, and updates, for instance, to its firmware, software (e.g., including executable instructions, applications, program modules), and operating system.

According to one embodiment, the client computing entity 102 may comprise location determining aspects, devices, modules, functionalities, and/or similar words used herein interchangeably. For example, the client computing entity 102 may comprise outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This information/data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the client computing entity's 102 position in connection with a variety of other systems, including cellular towers, Wi-Fi access points, and/or the like. Similarly, the client computing entity 102 may comprise indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may comprise the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The client computing entity 102 may also comprise a user interface (that can comprise a display 316 coupled to a processing element 308) and/or a user input interface (coupled to a processing element 308). For example, the user interface may be a user application, browser, user interface, and/or similar words used herein interchangeably executing on and/or accessible via the client computing entity 102 to interact with and/or cause display of information/data from the document processing optimization computing entity 106, as described herein. The user input interface can comprise any of a number of devices or interfaces allowing the client computing entity 102 to receive data, such as a keypad 318 (hard or soft), a touch display, voice/speech or motion interfaces, or other input device. In embodiments including a keypad 318, the keypad 318 can comprise (or cause display of) the conventional numeric (0-9) and related keys (#, *), and other keys used for operating the client computing entity 102 and may comprise a full set of alphabetic keys or set of keys that may be activated to provide a full set of alphanumeric keys. In addition to providing input, the user input interface can be used, for example, to activate or deactivate certain functions, such as screen savers and/or sleep modes.

The client computing entity 102 can also comprise volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the client computing entity 102. As indicated, this may comprise a user application that is resident on the entity or accessible through a browser or other user interface for communicating with the document processing optimization computing entity 106 and/or various other computing entities.

In another embodiment, the client computing entity 102 may comprise one or more components or functionality that are the same or similar to those of the document processing optimization computing entity 106, as described in greater detail above. As will be recognized, these architectures and descriptions are provided for exemplary purposes only and are not limiting to the various embodiments.

In various embodiments, the client computing entity 102 may be embodied as an artificial intelligence (AI) computing entity, such as an Amazon Echo, Amazon Echo Dot, Amazon Show, Google Home, and/or the like. Accordingly, the client computing entity 102 may be configured to provide and/or receive information/data from a user via an input/output mechanism, such as a display, a camera, a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

Exemplary Agent Computing Entity

FIG. 4 provides an illustrative schematic representative of an agent computing entity 103 that can be used in conjunction with embodiments of the present invention. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Agent computing entities 103 can be operated by various parties. As shown in FIG. 4, the agent computing entity 103 can comprise an antenna 412, a transmitter 404 (e.g., radio), a receiver 406 (e.g., radio), and a processing element 408 (e.g., CPLDs, microprocessors, multi-core processors, coprocessing entities, ASIPs, microcontrollers, and/or controllers) that provides signals to and receives signals from the transmitter 404 and receiver 406, correspondingly.

The signals provided to and received from the transmitter 404 and the receiver 406, correspondingly, may comprise signaling information/data in accordance with air interface standards of applicable wireless systems. In this regard, the agent computing entity 103 may be capable of operating with one or more air interface standards, communication protocols, modulation types, and access types. More particularly, the agent computing entity 103 may operate in accordance with any of a number of wireless communication standards and protocols, such as those described above with regard to the document processing optimization computing entity 106. In a particular embodiment, the agent computing entity 103 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the agent computing entity 103 may operate in accordance with multiple wired communication standards and protocols, such as those described above with regard to the document processing optimization computing entity 106 via a network interface 420.

Via these communication standards and protocols, the agent computing entity 103 can communicate with various other entities using concepts such as Unstructured Supplementary Service Data (USSD), Short Message Service (SMS), Multimedia Messaging Service (MIMS), Dual-Tone Multi-Frequency Signaling (DTMF), and/or Subscriber Identity Module Dialer (SIM dialer). The agent computing entity 103 can also download changes, add-ons, and updates, for instance, to its firmware, software (e.g., including executable instructions, applications, program modules), and operating system.

According to one embodiment, the agent computing entity 103 may comprise location determining aspects, devices, modules, functionalities, and/or similar words used herein interchangeably. For example, the agent computing entity 103 may comprise outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This information/data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the agent computing entity's 103 position in connection with a variety of other systems, including cellular towers, Wi-Fi access points, and/or the like. Similarly, the agent computing entity 103 may comprise indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may comprise the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The agent computing entity 103 may also comprise a user interface (that can comprise a display 416 coupled to a processing element 408) and/or a user input interface (coupled to a processing element 408). For example, the user interface may be a user application, browser, user interface, and/or similar words used herein interchangeably executing on and/or accessible via the agent computing entity 103 to interact with and/or cause display of information/data from the document processing optimization computing entity 106, as described herein. The user input interface can comprise any of a number of devices or interfaces allowing the agent computing entity 103 to receive data, such as a keypad 418 (hard or soft), a touch display, voice/speech or motion interfaces, or other input device. In embodiments including a keypad 418, the keypad 418 can comprise (or cause display of) the conventional numeric (0-9) and related keys (#, *), and other keys used for operating the agent computing entity 103 and may comprise a full set of alphabetic keys or set of keys that may be activated to provide a full set of alphanumeric keys. In addition to providing input, the user input interface can be used, for example, to activate or deactivate certain functions, such as screen savers and/or sleep modes.

The agent computing entity 103 can also comprise volatile storage or memory 422 and/or non-volatile storage or memory 424, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the agent computing entity 103. As indicated, this may comprise a user application that is resident on the entity or accessible through a browser or other user interface for communicating with the document processing optimization computing entity 106 and/or various other computing entities.

In another embodiment, the agent computing entity 103 may comprise one or more components or functionality that are the same or similar to those of the document processing optimization computing entity 106, as described in greater detail above. As will be recognized, these architectures and descriptions are provided for exemplary purposes only and are not limiting to the various embodiments.

In various embodiments, the agent computing entity 103 may be embodied as an artificial intelligence (AI) computing entity, such as an Amazon Echo, Amazon Echo Dot, Amazon Show, Google Home, and/or the like. Accordingly, the agent computing entity 103 may be configured to provide and/or receive information/data from a user via an input/output mechanism, such as a display, a camera, a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

V. EXEMPLARY SYSTEM OPERATIONS

Various embodiments of the present invention provide techniques for increasing efficiency and reliability of document processing systems by dynamically separating a batch of documents into processing groups based at least in part on structural similarity of the pages of the noted documents. Absent this dynamic separation process, processing of documents by processing agents (e.g., automated processing agents) may be less efficient and less accurate, as the processing agents will be less likely to capture cross-temporal expertise acquired from repeatedly processing input documents having similar structural formats. This in turn reduces the overall operational bandwidth and overall operational reliability of a multi-agent distributed document processing system. Accordingly, by dynamically separating a batch of documents into processing groups based at least in part on structural similarity of the pages of the noted documents, various embodiments of the present invention make important technical contributions to efficiency and reliability of document processing systems, and substantially improve overall operational bandwidth and overall operational reliability of existing multi-agent distributed document processing systems.

FIG. 5 is a flowchart diagram of an example process 500 for performing document processing optimization. Via the various steps/operations of the process 500, the document processing optimization computing entity 106 can efficiently and reliably separate a batch of input documents into processing groups based at least in part on layout similarities between input document pairs in the batch of input documents.

The process 500 begins at step/operation 501 when the document processing optimization computing entity 106 identifies a plurality of input pages. Each input page of the plurality of input pages may be associated with an input document of a plurality of input documents. An input document may be a data object that describes a collection of content data including a collection of text data and/or a collection of image data. Examples of the input documents include PDF documents, TIFF documents, Microsoft Word files, and/or the like. Each input document includes one or more input pages. In some embodiments, each input page of the plurality of input pages is a visually contagious unit of an input document. Each input page of the plurality of input pages may include one or more content segments. In some embodiments, each content segment is a visually contagious segment of an input page.

FIG. 6 depicts an operational example of a process for dividing a group of documents into input pages. As depicted in FIG. 6, input document 601 has been divided into input pages 602-604. In some embodiments, an input page includes one or more content segments which are of similar or different types. As a non-limiting example, an input page may five page segments, including one picture subsegment, one graph subsegment, and three separate word subsegments.

In some embodiments, the document processing optimization computing entity 106 receives the plurality of input documents from the client computing entity 102. Receiving the plurality of input documents may involve applying a time window to a stream of incoming input documents. The time window may be a data object that describe a time interval during which the document processing optimization computing entity 106 receives the plurality of documents. Alternatively, receiving the plurality of input documents may involve applying a quantity window to the stream of incoming documents. The quantity window may be a data objects that describes a number of input documents which the document processing optimization computing entity 106 receives for processing.

At step/operation 502, the document processing optimization computing entity 106 processes each input page using a trained encoder model in order to generate a fixed-dimensional representation of the input page. In some embodiments, the document processing optimization computing entity 106 processes each input page for an input document of the plurality of input documents using a trained encoder model in order to generate a fixed-dimensional representation of the noted input page. In some embodiments, the trained encoder model is a convolutional neural network configured to generate a fixed-dimensional representation for each input page.

In some embodiments, step/operation 502 may be performed in relation to a particular input page of the plurality of input pages in accordance with the process depicted in FIG. 7. The process depicted in FIG. 7 begins at step/operation 701 when the document processing optimization computing entity 106 generates a segmented page for the particular input page that describes one or more input page segments of the particular input page. In some embodiments, in order to generate the segmented page for the particular input page document, the document processing optimization computing entity 106 identifies one or more page segments in the particular input page, where each page segment of the one or more page segments is associated with a corresponding group of pixels of the particular input page. In some embodiments, each page segment includes a group of pixels of the particular input page that have a common content format, e.g., a common textual format, a common pictorial format, a common graphical format, and/or the like.

In some embodiments, the document processing optimization computing entity 106 identifies input page segments of the particular input page by using a recursive page segmentation algorithm. A recursive page segmentation algorithm may be configured to start by identifying the entirety of the particular input page as being part of one input page segment, then proceed to iteratively identify smaller and smaller subsegments of the particular input page based at least in part on subdividing subsegments identified in a previous iteration until a stopping condition about similarity of data within an identified segment is reached.

After reaching the stopping condition, the recursive page segmentation algorithm may determine input page segments of the particular input page based at least in part on the output of a final iteration of the noted recursive page segmentation algorithm.

FIG. 8 provides an operational example of generating a segmented page 822 for a particular input page 821. As shown in FIG. 8, the document processing optimization computing entity 106 has identified various page segments of the input page 821 (e.g., page segments 801-803) and has generated the segmented page 822 for the input page 821 based at least in part on the various identified page segments of the input page 821. For example, the segmented page 822 includes the page segment 811 which corresponds to the page segment 801 of the input page 821. As another example, the segmented page 822 includes the page segment 812 which corresponds to the page segment 802 of the input page 821. As yet another example, the segmented page 822 includes the page segment 813 which corresponds to the page segment 803 of the input page 821.

Returning to FIG. 7, at step/operation 702, the document processing optimization computing entity 106 may optionally update the segmented page based at least in part on each content pixel density ratio for a page segment. The segmented page for the particular input page may be configured to describe each content pixel density ratio for a page segment in the particular input page as a grayscale value, where the grayscale intensity of a page segment may describe the relative magnitude of the content pixel density ratio for the pixel density ratio.

The content pixel density ratio may be a data object that describes a ratio of pixels of a corresponding segment that is occupied by the content format associated with the page segment. For example, if a page segment is entirely occupied by a picture, it has a 100% content pixel density ratio. As another example, if a text-based page segment is 90% occupied by letter-depicting pixels and 10% occupied by whitespace pixels, it has a 90% pixel density ratio. In general, page segments depicting smaller text typically are associated with higher content pixel density ratio relative to page segments depicting larger text. Moreover, page segments depicting images typically are associated with higher content pixel density ratio relative to page segments depicting text content.

In some embodiments, to update the segmented page, the document processing optimization computing entity 106 replaces each page segment of the segmented page with a segment color, where the magnitude of the segment color indicates a relative value of the content pixel density ratio for the page segment. For example, the document processing optimization computing entity 106 replaces each page segment with a greyscale page segment. This page segment replacement may cause a clustering algorithm to ignore finer details, e.g., font style and size, of page segments that may vary widely across documents and instead focus on input page layout, which may be a better indicator of functional similarity of documents for the purposes of work basket optimization in a document processing optimization system.

FIG. 9 provides an operational example of updating a segmented page by replacing each page segment of the segmented page with a grayscale-valued box. As depicted in the grayscale-valued segmented page 900 of FIG. 9, the grayscale value of each grayscale-valued box describes the magnitude of the content pixel density ratio of the page segment associated with the grayscale-valued box. For example, the page segment associated with the grayscale-valued box 902 is deemed to have a higher content pixel density ratio relative to both the page segment associated with the grayscale-valued box 901 and the page segment associated with the grayscale-valued box 901. As another example, the page segment associated with the grayscale-valued box 901 is deemed to have a higher content pixel density ratio relative to the page segment associated with the grayscale-valued box 903.

Returning to FIG. 7, at step/operation 703, the document processing optimization computing entity 106 may optionally update the segmented page by performing down-sampling on the segmented page. In some embodiments, as part of the down-sampling, the dimensions of the segmented page may be modified to a standard dimension for input pages configured to be processed by the trained encoder model. In some embodiments, the document processing optimization computing entity 106 may down-sample input documents by reducing a disparity between similar grayscale values, which may in turn enhance the semantic relevance of fixed-dimensional representations generated based at least in part on processing the segmented pages and increase the effectiveness of the document clusters generated based at least in part on the noted fixed-dimensional representations. In some embodiments, step/operation 703 may be performed instead of the step/operation 702. In some embodiments, step/operation 703 may be performed in addition to the step/operation 702, e.g., subsequent to the step/operation 702 and/or prior to the step/operation 702.

At step/operation 704, the document processing optimization computing entity 106 generates the trained encoder model. A flowchart of performing generating the trained encoder model is depicted in FIG. 10. At step/operation 1001, the document processing optimization computing entity 106 determines a fixed-dimensional representation for each training page of a plurality of training pages using an encoder model. In some embodiments, the document processing optimization computing entity 106 trains the encoder model using an encoder-decoder architecture. To that end, the document processing optimization computing entity 106 feeds a first image to encoder. The encoder generates a fixed-dimensional representation of the first image. The encoder then uses the fixed-dimensional representation of the first image to generate a reconstructed first image. Afterwards, the document processing optimization computing entity 106 compares the first image to the reconstructed first image to determine an error measure and use the error measure to set encoder parameters. A training page is a data object that describes a page that is configured to be used for training the encoder-decoder model. A fixed-dimensional representation for a corresponding training page is a data object that describes a vector generated by an encoder model after processing the corresponding training page based at least in part on the parameters of the encoder model.

At step/operation 1002, the document processing optimization computing entity 106 processes each fixed-dimensional representation using a decoder model to generate a reconstructed page. The encoder model encodes each input page into a fixed-dimensional representation. On the other hand, the decoder model is configured to generate a reconstructed page for each training page based at least in part on the fixed-dimensional representation for the training page. The reconstructed page has a similar dimension as the input page. The reconstructed pages include a reconstructed page for each training page of the plurality of training pages.

Afterwards, at step/operation 1003, the document processing optimization computing entity 106 determines an error measure for the encoder model based at least in part on each reconstructed page. The error measure may be determined based at least in part on a measure of deviation between the reconstructed pages and their corresponding training pages.

At step/operation 1004, the document processing optimization computing entity 106 generates the trained error model based at least in part on the error measure. In some embodiments, the document processing optimization computing entity 106 generates the trained error model based at least in part on updating parameters of the encoder model in accordance with the error measure. In some embodiments, the document processing optimization computing entity 106 uses a gradient descent algorithm to generate the trained error model in order to minimize based at least in part on error measure.

At step/operation 705, the document processing optimization computing entity 106 processes each segmented page for an input page of the plurality of input pages using a trained encoder model to generate a fixed-dimensional representation of the input page associated with the segmented page. The fixed-dimensional representation for an input page may describe a vector generated by an encoder model after processing the corresponding segmented page associated with the input page based at least in part on the parameters of the encoder model. For example, as depicted in FIG. 11, the trained autoencoder model 1102 generates a batch of fixed-dimensional representations 1103 that includes a fixed-dimensional representation for each segmented page in a batch of segmented pages 1101.

Returning to FIG. 5, at step/operation 503, the document processing optimization computing entity 106 determines a plurality of document clusters based at least in part on each fixed-dimensional representation for an input page of the plurality of input pages that are associated with the plurality of input documents. In some embodiments, each document cluster of the plurality of document clusters includes a subset of the plurality of documents that are deemed to be sufficiently similar based at least in part on the fixed-dimensional representations of the plurality of input pages associated with the plurality of input documents.

In some embodiments, step/operation 503 can be performed in accordance with the process depicted in FIG. 12. The process depicted in FIG. 12 begins at step/operation 1201 when the document processing optimization computing entity 106 identifies a plurality of document pairs of a plurality of document pairs, where each document pair of the plurality of document pairs includes a first document of the plurality of input documents and a second document of the plurality of input documents.

At step/operation 1202, the document processing optimization computing entity 106 determines a cross-document similarity score for each document pair based at least in part on each fixed-dimensional representation for an input page in a first subset of the plurality of input pages that is associated with the first document in the document pair and each fixed-dimensional representation for an input page in a second subset of the plurality of input pages that is associated with the second document in the document pair. In other words, the document processing optimization computing entity 106 determines the cross-document similarity score for a document pair based at least in part on all of the fixed-dimensional representations associated with the input pages of the two documents in the document pair. In some embodiments, to determine the cross-document similarity score for a document pair, the document processing optimization computing entity 106 uses a Jaccard similarity measure based at least in part on the cross-page similarity measures associated with input page pairs, where each input page pair comprises a first input page in a first document in the document pair and a second input page in a second document in the document pair.

In some embodiments, to determine the cross-document similarity score for a document pair, the document processing optimization computing entity 106 first identifies a first subset of the plurality of the input pages that includes all of the input pages that are part of the first input document in the document pair as well as a second subset of the plurality of the input pages that includes all of the input pages that are part of the second input document in the document pair. Afterward, the document processing optimization computing entity 106 identifies a plurality of page pairs, where each page pair of the plurality of page pairs includes a first input page from the first subset of the plurality of input pages and a second input page from the second subset of the plurality of input pages. Next, the document processing optimization computing entity 106 determines a cross-page similarity score for each page pair based at least in part on the fixed-dimensional representation for the first input page in the page pair and the fixed-dimensional representation for the second input page in the page pair. Thereafter, the document processing optimization computing entity 106 determines a similar-page count for the particular document pair based at least in part on a count of the plurality of page pairs whose respective cross-page similarity scores exceeds a cross-page similarity threshold; and determines the cross-document similarity score based at least in part on the similar-page count and a total count of the plurality of input pages.

At step/operation 1203, the document processing optimization computing entity 106 determines the plurality of document clusters based at least in part on each cross-document similarity score for a document pair of the plurality of document pairs. In some embodiments, the document processing optimization computing entity 106 may use the pairwise document similarity scores with a clustering algorithm to generate clusters of similar documents. In some embodiments, the document processing optimization computing entity 106 may cluster documents based at least in part on the cross-document similarity scores for document pairs. For example, the document processing optimization computing entity 106 may cluster a first document along with any documents whose respective cross-document similarity score with respect to the first document exceeds a cross-document similarity score threshold. In some embodiments, a density-based spatial clustering of applications with noise (DBSCAN) algorithm may be used to determine the documents clusters based at least in part on each cross-document similarity score for a document pair of the plurality of document pairs.

Alternatively, the document processing optimization computing entity 106 may determine the plurality of document clusters based at least in part on the page clusters. A flowchart diagram of an example process for determining a plurality of document clusters using page clusters is depicted in FIG. 13. The process depicted in FIG. 13 begins at step/operation 1301 when the document processing optimization computing entity 106 generates a reduced-dimensional representation for each input page of the plurality of input pages. In some embodiments, to generate the reduced-dimensional representation for an input page, the document processing optimization computing entity 106 performs t-distributed Stochastic Neighbor Embedding (t-SNE) on the fixed-dimensional representation of the input page.

In some embodiments, the document processing optimization computing entity 106 reduces the input page representation dimension in a way that separates different page types. For example, the document processing optimization computing entity 106 uses a t-SNE method to generate reduced-dimensional representation for each input pages. In some embodiments, the document processing optimization computing entity 106 uses the t-SNE method to construct a probability distribution over pairs of high-dimensional objects in such a way that similar objects have a high probability of being picked while dissimilar points have an extremely small probability of being picked. Afterwards, the document processing optimization computing entity 106 defines a similar probability distribution over the points in the low-dimensional map, and minimizes a divergence between the two distributions with respect to locations of the points in the map.

At step/operation 1302, the document processing optimization computing entity 106 determines a plurality of page clusters based at least in part on each reduced-dimensional representation for an input page of the plurality of input pages. In some embodiments, the document processing optimization computing entity 106 processes each reduced-dimensional representation for an input page of the plurality of input pages using a clustering algorithms to generate the plurality of page clusters, where each page cluster of the plurality of page clusters includes a related subset of the plurality of input pages.

At step/operation 1303, the document processing optimization computing entity 106 determines the plurality of document clusters based at least in part on the plurality of page clusters. As an example, given input documents D1, D2, and D3, and determined page clusters C1 and C1, if D1 has 80% of its pages in C1 20% of its pages in C2, and further if D2 has 70% of its pages in C1 and 30% in C2, and further if D3 has 10% of its pages in C1 and 90% of its pages in C2, the document processing optimization computing entity 106 may determine a document cluster DC1 that includes D1 and D2, as well as a document cluster DC2 that includes D3.

In some embodiments, the document processing optimization computing entity 106 generates a document-cluster relatedness score for each document-cluster pair of a plurality of document-cluster pairs that comprises an input document of the plurality of input documents and a page cluster of the plurality of page clusters and generates the plurality of document clusters based at least in part on each document-cluster relatedness score for a document-cluster pair of the plurality of document-cluster pairs. A document-cluster relatedness score for a document-cluster pair may be a data object that describes an estimated relevance of the document associated with the document-cluster pair and the page cluster associated with the document-cluster pair. For example, if 80% of the input pages associated with a first input document fall within a first page cluster, the document processing optimization computing entity 106 may determine a document-cluster relatedness score of 0.8 for the document-cluster pair that includes the first input document and the first page cluster. In some embodiments, the document processing optimization computing entity 106 associates each input document to a document cluster that includes all input documents having a highest document-cluster relatedness score with respect to a particular page cluster. For example, if an input document D1 has a 0.1 document-cluster relatedness score with respect to a page cluster C1, a 0.8 document-cluster relatedness score with respect to a page cluster C2, and a 0.1 document-cluster relatedness score with respect to a page cluster C3, and further if an input document D2 has a 0.3 document-cluster relatedness score with respect to a page cluster C1, a 0.4 document-cluster relatedness score with respect to a page cluster C2, and a 0.3 document-cluster relatedness score with respect to a page cluster C3, the document processing optimization computing entity 106 may assign both D1 and D2 to the same document cluster that includes input documents having the highest document-cluster relatedness score with respect to the page cluster C2.

Returning to FIG. 5, at step/operation 504, the document processing optimization computing entity 106 performs document processing optimization based at least in part on the plurality of document clusters. In some embodiments, to perform document processing optimization, the document processing optimization computing entity 106 determines a plurality of processing groups based at least in part on the plurality of document clusters. In some embodiments, each processing group of the plurality of processing groups is associated with one or more related document clusters of the plurality of document clusters. In some embodiments, each processing group of the plurality of processing groups comprises a subset of the plurality of input documents that is associated with at least one of the one or more related document clusters for the processing group. In some embodiments, each processing group of the plurality of processing groups is associated with an assigned processing agent (e.g., an assigned human agent, an assigned automated agent, and/or the like) of a plurality of processing agents.

In some embodiments, step/operation 504 may be performed in accordance with the process depicted in FIG. 14. The process depicted in FIG. 14 begins at step/operation 1401 when the document processing optimization computing entity 106 determines the plurality of processing groups based at least in part on the document clusters. In some embodiments, each determined processing group describes a document processing queue associated with a corresponding processing agent. FIG. 15 provides an operational example of determining processing groups. As shown in FIG. 15, the document processing optimization computing entity 106 determines the processing groups 1502 based at least in part on the document clusters 1501. For example, the processing group 1521 includes the document cluster 1511 and the document cluster 1512. As another example, the processing group 1522 includes the document cluster 1513 and the document cluster 1512.

At step/operation 1402, the document processing optimization computing entity 106 assigns each processing group to a processing agent. In some embodiments, each processing agent may be a data object that describes an automated agent and/or a manual agent configured to perform document processing. In some embodiments, the document processing optimization computing entity 106 assigns the processing group to processing agents randomly. Alternatively, in some embodiments, the document processing optimization computing entity 106 assigns the processing group to processing agents based at least in part on cross-document-cluster similarities scores between pairs of document clusters, such that each processing agent is assigned document clusters with similar layouts across input documents of the noted document lusters. In some embodiments, the document processing optimization computing entity 106 assigns the processing group to processing agents based at least in part on historical data associated with a particular processing agent, availability of processing agents, or past experience with a particular processing agent. In some embodiments, the document processing optimization computing entity 106 may assign a particular processing group to more than one processing agents.

At step/operation 1403, the document processing optimization computing entity 106 causes the processing agents to perform document processing. In some embodiments, the document processing optimization computing entity 106 generates notifications for the processing agents that are configured to notify the processing agents of their relative document processing queues. The document processing optimization computing entity 106 may further update the work docket of the processing agents. In some embodiments, the document processing optimization computing entity 106 updates a work user interface of the processing agent. In some embodiments, the document processing optimization entity 106 causes an automated processing agent (e.g., a software program) to perform document processing on the input documents that are in processing groups associated with the automated processing agent.

VI. CONCLUSION

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer-implemented method for document processing optimization, the computer-implemented method comprising:
   identifying a plurality of input pages each associated with a related input document of a plurality of input documents;
   for each input page of the plurality of input pages, generating a segmented page, wherein generating the segmented page for a particular input page of the plurality of input pages comprises:
      identifying one or more page segments in the particular input page, wherein each page segment of the one or more page segments is associated with a relative location within the particular input page;
      for each page segment of the one or more page segments, determining a content pixel density ratio, wherein the content pixel density ratio for the page segment is descriptive of a ratio of pixels of the page segment that are occupied by a content format associated with the page segment;
      generating the segmented page as a data object that describes, for each page segment of the one or more page segments, the relative location for the page segment and the content pixel density ratio for the page segment; and
      wherein the segmented page for the particular input page is configured to describe the content pixel density ratio for the page segment as a grayscale value, and wherein generating the segmented page as the data object comprises: updating the segmented page by replacing the page segment with a segment color, wherein a magnitude of the segment color indicates a relative value of the content pixel density ratio for the page segment;
   processing each segmented page for an input page of the plurality of input pages using a trained encoder model in order to generate a fixed-dimensional representation of the input page;
   determining, based at least in part on each fixed-dimensional representation for an input page of the plurality of input pages, a plurality of document clusters, wherein each document cluster of the plurality of document clusters comprises a related subset of the plurality of documents;
   determining a plurality of processing groups, wherein: (i) each processing group of the plurality of processing groups is associated with one or more related document clusters of the plurality of document clusters, (ii) each processing group of the plurality of processing groups comprises a subset of the plurality of input documents that is associated with at least one of the one or more related document clusters for the processing group, and (iii) each processing group of the plurality of processing groups is associated with an assigned processing agent of a plurality of processing agents; and
   performing the document processing optimization based at least in part on the plurality of processing groups.

2. The computer-implemented method of claim 1, wherein generating the trained encoder model comprises:
   for each training page of a plurality of training pages, determining a training fixed-dimensional representation using an encoder model;
   processing each training fixed-dimensional representation for a training page of the plurality of training pages using a decoder model in order to generate a plurality of reconstructed pages, wherein the plurality of reconstructed pages comprise a reconstructed page for each training page of the plurality of training pages;
   determining an error measure for the encoder model based at least in part on the plurality of training pages and the plurality of reconstructed pages; and
   updating parameters of the encoder model in accordance with the error measure in order to generate the trained encoder model.

3. The computer-implemented method of claim 1, wherein generating the segmented page of the particular input page further comprises:
   subsequent to generating the segmented page, updating the segmented page by performing down-sampling on the segmented page.

4. The computer-implemented method of claim 1, wherein determining the plurality of document clusters comprises:
   identifying a plurality of document pairs, wherein each document pair of the plurality of document pairs comprises a first document of the plurality of input documents and a second document of the plurality of input documents;
   for each document pair of the plurality of document pairs, determining a cross-document similarity score based at least in part on each fixed-dimensional representation for an input page in a first subset of the plurality of input pages that is associated with the first document in the document pair and each fixed-dimensional representation for an input page in a second subset of the plurality of input pages that is associated with the second document in the document pair; and determining the plurality of document clusters based at least in part on each cross-document similarity score for a document pair of the plurality of document pairs.

5. The computer-implemented method of claim 4, wherein determining the cross-document similarity score for a particular document pair of the plurality of document pairs comprises:

for each page pair of a plurality of page pairs that comprises a first input page in the first subset associated with the particular document pair and a second input page in the second subset associated with the particular document pair, determining a cross-page similarity score based at least in part on the fixed-dimensional representation for the first input page in the page pair and the fixed-dimensional representational for the second input page in the page pair;

determining a similar-page count for the particular document pair based at least in part on a count of the plurality of page pairs whose respective cross-page similarity scores exceeds a cross-page similarity threshold; and determining the cross-document similarity score based at least in part on the similar-page count and a total count of the plurality of input pages.

6. The computer-implemented method of claim 1, wherein determining the plurality of document clusters comprises:

performing t-distributed stochastic neighbor embedding on each fixed-dimensional representation for an input page of the plurality of input pages to generate a reduced-dimensional representation for each input page of the plurality of input pages;

clustering each reduced-dimensional representation for an input page of the plurality of input pages into a plurality of page clusters;

for each document-cluster pair of a plurality of document-cluster pairs that comprises an input document of the plurality of input documents and a page cluster of the plurality of page clusters, generating a document-cluster relatedness score; and generating the plurality of document clusters based at least in part on each document-cluster relatedness score for a document-cluster pair of the plurality of document-cluster pairs.

7. The computer-implemented method of claim 1, wherein performing the document processing optimization comprises:

causing each processing agent of the plurality of assigned agents to perform document processing on the processing group that is associated with the processing agent.

8. The computer-implemented method of claim 1, wherein identifying one or more page segments in the particular input page comprises processing the particular input page using a recursive page segmentation algorithm.

9. An apparatus for document processing optimization, the apparatus comprising at least one processor and at least one memory including program code, the at least one memory and the program code configured to, with the processor, cause the apparatus to at least:

identify a plurality of input pages each associated with a related input document of a plurality of input documents;

for each input page of the plurality of input pages, generate a segmented page, wherein generating the segmented page for a particular input page of the plurality of input pages comprises:

identifying one or more page segments in the particular input page, wherein each page segment of the one or more page segments is associated with a relative location within the particular input page;

for each page segment of the one or more page segments, determining a content pixel density ratio, wherein the content pixel density ratio for the page segment is descriptive of a ratio of pixels of the page segment that are occupied by a content format associated with the page segment;

generating the segmented page as a data object that describes, for each page segment of the one or more page segments, the relative location for the page segment and the content pixel density ratio for the page segment; and wherein the segmented page for the particular input page is configured to describe the content pixel density ratio for the page segment as a grayscale value, and wherein generating the segmented page as the data object comprises: updating the segmented page by replacing the page segment with a segment color, wherein a magnitude of the segment color indicates a relative value of the content pixel density ratio for the page segment;

process each segmented page for an input page of the plurality of input pages using a trained encoder model in order to generate a fixed-dimensional representation of the input page;

determine, based at least in part on each fixed-dimensional representation for an input page of the plurality of input pages, a plurality of document clusters, wherein each document cluster of the plurality of document clusters comprises a related subset of the plurality of documents;

determine a plurality of processing groups, wherein: (i) each processing group of the plurality of processing groups is associated with one or more related document clusters of the plurality of document clusters, (ii) each processing group of the plurality of processing groups comprises a subset of the plurality of input documents that is associated with at least one of the one or more related document clusters for the processing group, and (iii) each processing group of the plurality of processing groups is associated with an assigned processing agent of a plurality of processing agents; and perform the document processing optimization based at least in part on the plurality of processing groups.

10. The apparatus of claim 9, wherein generating the trained encoder model comprises:

for each training page of a plurality of training pages, determining a training fixed-dimensional representation using an encoder model;

processing each training fixed-dimensional representation for a training page of the plurality of training pages using a decoder model in order to generate a plurality of reconstructed pages, wherein the plurality of reconstructed pages comprise a reconstructed page for each training page of the plurality of training pages;

determining an error measure for the encoder model based at least in part on the plurality of training pages and the plurality of reconstructed pages; and updating parameters of the encoder model in accordance with the error measure in order to generate the trained encoder model.

11. The apparatus of claim 9, wherein determining the plurality of document clusters comprises:

identifying a plurality of document pairs, wherein each document pair of the plurality of document pairs comprises a first document of the plurality of input documents and a second document of the plurality of input documents;

for each document pair of the plurality of document pairs, determining a cross-document similarity score based at least in part on each fixed-dimensional representation for an input page in a first subset of the plurality of input pages that is associated with the first document in the document pair and each fixed-dimensional representation for an input page in a second subset of the plurality of input pages that is associated with the second document in the document pair; and determining the plurality of document clusters based at least in part on each cross-document similarity score for a document pair of the plurality of document pairs.

12. The apparatus of claim 11, wherein determining the cross-document similarity score for a particular document pair of the plurality of document pairs comprises:

for each page pair of a plurality of page pairs that comprises a first input page in the first subset associated with the particular document pair and a second input page in the second subset associated with the particular document pair, determining a cross-page similarity score based at least in part on the fixed-dimensional representation for the first input page in the page pair and the fixed-dimensional representational for the second input page in the page pair;

determining a similar-page count for the particular document pair based at least in part on a count of the plurality of page pairs whose respective cross-page similarity scores exceeds a cross-page similarity threshold; and determining the cross-document similarity score based at least in part on the similar-page count and a total count of the plurality of input pages.

13. The apparatus of claim 9, wherein determining the plurality of document clusters comprises:

performing t-distributed stochastic neighbor embedding on each fixed-dimensional representation for an input page of the plurality of input pages to generate a reduced-dimensional representation for each input page of the plurality of input pages;

clustering each reduced-dimensional representation for an input page of the plurality of input pages into a plurality of page clusters;

for each document-cluster pair of a plurality of document-cluster pairs that comprises an input document of the plurality of input documents and a page cluster of the plurality of page clusters, generating a document-cluster relatedness score; and generating the plurality of document clusters based at least in part on each document-cluster relatedness score for a document-cluster pair of the plurality of document-cluster pairs.

14. The apparatus of claim 9, wherein performing the document processing optimization comprises:

causing each processing agent of the plurality of assigned agents to perform document processing on the processing group that is associated with the processing agent.

15. The apparatus of claim 9, wherein identifying one or more page segments in the particular input page comprises processing the particular input page using a recursive page segmentation algorithm.

16. A computer program product for document processing optimization, the computer program product comprising at least one non-transitory computer-readable storage medium having computer-readable program code portions stored therein, the computer-readable program code portions configured to:

identify a plurality of input pages each associated with a related input document of a plurality of input documents;

for each input page of the plurality of input pages, generate a segmented page, wherein generating the segmented page for a particular input page of the plurality of input pages comprises:

identifying one or more page segments in the particular input page, wherein each page segment of the one or more page segments is associated with a relative location within the particular input page;

for each page segment of the one or more page segments, determining a content pixel density ratio, wherein the content pixel density ratio for the page segment is descriptive of a ratio of pixels of the page segment that is occupied by a content format associated with the page segment;

generating the segmented page as a data object that describes, for each page segment of the one or more page segments, the relative location for the page segment and the content pixel density ratio for the page segment; and wherein the segmented page for the particular input page is configured to describe the content pixel density ratio for the page segment as a grayscale value, and wherein generating the segmented page as the data object comprises: updating the segmented page by replacing the page segment with a segment color, wherein a magnitude of the segment color indicates a relative value of the content pixel density ratio for the page segment;

process each segmented page for an input page of the plurality of input pages using a trained encoder model in order to generate a fixed-dimensional representation of the input page;

determine, based at least in part on each fixed-dimensional representation for an input page of the plurality of input pages, a plurality of document clusters, wherein each document cluster of the plurality of document clusters comprises a related subset of the plurality of documents;

determine a plurality of processing groups, wherein: (i) each processing group of the plurality of processing groups is associated with one or more related document clusters of the plurality of document clusters, (ii) each processing group of the plurality of processing groups comprises a subset of the plurality of input documents that is associated with at least one of the one or more related document clusters for the processing group, and (iii) each processing group of the plurality of processing groups is associated with an assigned processing agent of a plurality of processing agents; and perform the document processing optimization based at least in part on the plurality of processing groups.

17. The computer program product of claim 16, wherein generating the trained encoder model comprises:

for each training page of a plurality of training pages, determining a training fixed-dimensional representation using an encoder model;

processing each training fixed-dimensional representation for a training page of the plurality of training pages using a decoder model in order to generate a plurality of reconstructed pages, wherein the plurality of reconstructed pages comprise a reconstructed page for each training page of the plurality of training pages;

determining an error measure for the encoder model based at least in part on the plurality of training pages and the plurality of reconstructed pages; and updating parameters of the encoder model in accordance with the error measure in order to generate the trained encoder model.

18. The computer program product of claim 16, wherein determining the plurality of document clusters comprises:

identifying a plurality of document pairs, wherein each document pair of the plurality of document pairs comprises a first document of the plurality of input documents and a second document of the plurality of input documents;

for each document pair of the plurality of document pairs, determining a cross-document similarity score based at least in part on each fixed-dimensional representation for an input page in a first subset of the plurality of input pages that is associated with the first document in the document pair and each fixed-dimensional representation for an input page in a second subset of the plurality of input pages that is associated with the second document in the document pair; and determining the plurality of document clusters based at least in part on each cross-document similarity score for a document pair of the plurality of document pairs.

19. The computer program product of claim 16, wherein determining the plurality of document clusters comprises:

performing t-distributed stochastic neighbor embedding on each fixed-dimensional representation for an input page of the plurality of input pages to generate a reduced-dimensional representation for each input page of the plurality of input pages;

clustering each reduced-dimensional representation for an input page of the plurality of input pages into a plurality of page clusters;

for each document-cluster pair of a plurality of document-cluster pairs that comprises an input document of the plurality of input documents and a page cluster of the plurality of page clusters, generating a document-cluster relatedness score; and generating the plurality of document clusters based at least in part on each document-cluster relatedness score for a document-cluster pair of the plurality of document-cluster pairs.

* * * * *